US006986003B1

(12) United States Patent
Sipple et al.

(10) Patent No.: US 6,986,003 B1
(45) Date of Patent: Jan. 10, 2006

(54) METHOD FOR PROCESSING COMMUNAL LOCKS

(75) Inventors: Ralph E. Sipple, Shoreview, MN (US); Wayne D. Ward, New Brighton, MN (US)

(73) Assignee: Unisys Corporation, Blue Bell, PA (US)

( * ) Notice: Subject to any disclaimer, the term of this patent is extended or adjusted under 35 U.S.C. 154(b) by 676 days.

(21) Appl. No.: 09/927,069

(22) Filed: Aug. 9, 2001

(51) Int. Cl.
*G06F 12/08* (2006.01)
*G06F 12/14* (2006.01)

(52) U.S. Cl. ....................... 711/145; 711/122; 711/150; 711/152; 711/163

(58) Field of Classification Search ................. 711/145, 711/150, 152, 122, 163
See application file for complete search history.

(56) References Cited

U.S. PATENT DOCUMENTS

| | | | | |
|---|---|---|---|---|
| 5,175,837 | A | | 12/1992 | Arnold et al. .............. 395/425 |
| 5,615,167 | A | | 3/1997 | Jain et al. |
| 5,678,026 | A | | 10/1997 | Vartti et al. |
| 5,848,241 | A | | 12/1998 | Misinai et al. |
| 5,875,485 | A | | 2/1999 | Matsumoto ................. 711/152 |
| 6,006,299 | A | | 12/1999 | Wang et al. ................ 710/108 |
| 6,047,358 | A | | 4/2000 | Jacobs |
| 6,052,760 | A | | 4/2000 | Bauman et al. ............. 711/119 |
| 6,148,300 | A | | 11/2000 | Singhal et al. ................. 707/8 |
| 6,457,102 | B1 | * | 9/2002 | Lambright et al. ......... 711/129 |
| 6,625,701 | B1 | | 9/2003 | Arimilli et al. |
| 2002/0069328 | A1 | * | 6/2002 | Chauvel ..................... 711/130 |
| 2002/0161955 | A1 | * | 10/2002 | Beukema et al. ........... 710/200 |
| 2003/0041225 | A1 | | 2/2003 | Matina et al. |

OTHER PUBLICATIONS

U.S. Appl. No. 09/650,730, filed Aug. 30, 2000, Mitchell A. Bauman et al., Leaky Cache Mechanism.
Final Rejection of S/N 09/925,592 mailed Jun. 9, 2004.

* cited by examiner

*Primary Examiner*—Mano Padmanabhan
*Assistant Examiner*—Midys Inoa
(74) *Attorney, Agent, or Firm*—Lise A. Rode; Charles A. Johnson; Mark T. Starr

(57) ABSTRACT

Multi-processor computer systems with multiple levels of cache memories are slowed down in trying to process software locks for common functions. This invention obviates the problem for the vast majority of transactions by providing an alternate procedure for handling so-called communal locks differently from ordinary software locks. The alternative procedure is not used for ordinary (non communal software lock) data and instruction transfers. The function of the CSWL (Communal SoftWare Lock) is actually accomplished at a specific cache to which an individual CSWL is mapped to, rather than sending the lock to the requesting process, which also enhances efficiency.

15 Claims, 19 Drawing Sheets

Lock Instructions

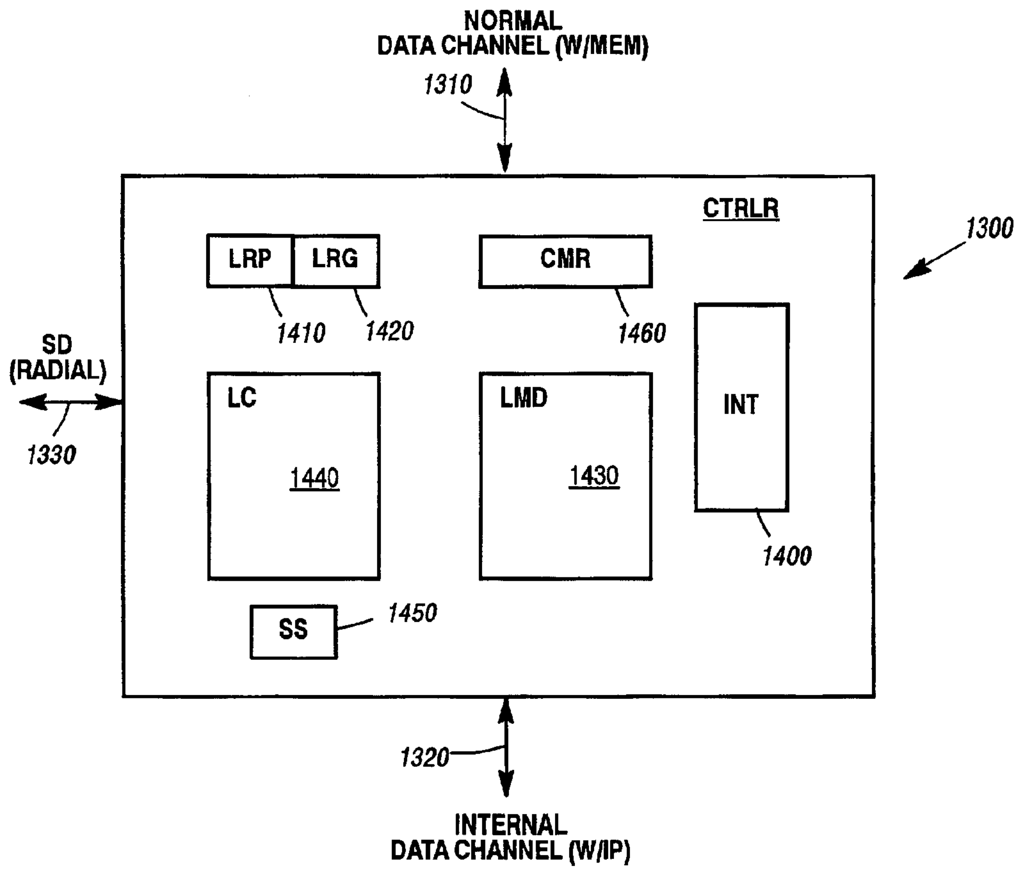

LRG = LOCK REQ. GENERATOR - GENERATES / FORWARDS LOCK REQUEST IF LRP SAYS IT D/N HAVE IT.
LRP = LOCK REQUEST (INSTRUCTION) PROCESSOR (HAS BIT CHANGER & CHECKS LMD & LC TO SEE IF (A) ITS HIS & (B) IF HE HAS IT)
SD = SIDE DOOR (INCLUDES ID INFO PATH)
CMR = COMPARITOR
LMD = LOCK MAP DIRECTORY
LC = LOCK CACHE
INT = INTERPRETER (IS THIS A LOCK REQUEST? ELSE PASS THROUGH AS NORMAL DATA)
SS = STATUS STRIPPER (SENDS BACK LOCK STATUS TO SIDE DOOR WHEN OPERATION COMPLETES IN RESP TO SIDE DOOR REQ)

*Figure 13*

METHOD FOR PROCESSING COMMUNAL LOCKS

RELATED APPLICATIONS

This is related to copending U.S. patent application Ser. Nos. 09/925,384 and 09/925,592 in that they share much of the same disclosure but claim related inventions.

A portion of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

This invention relates generally to multiprocessor computer system architecture and more particularly to systems and methods for reducing access time to memory cells containing highly utilized locks in order to improve throughput.

2. Background Information

In U.S. Pat. No. 6,052,760, issued to Bauman et al, (and commonly assigned to Unisys Corporation with the instant patent and hereby incorporated herein in its entirety by this reference), a system for providing identifiable software locks in a multiprocessor system with a memory hierarchy having independently functioning data caches and a main memory is described. This Bauman system required significant processing cycle time for discovering whether data was locked, if the data was owned by remote processors in Bauman's system. The instant invention overcomes this significant limitation.

Other systems for providing locks over data in multiprocessor systems having first and second level caches are described in U.S. Pat. No. 6,006,299 issued to Wang et al, and U.S. Pat. No. 5,175,837 issued to Arnold et al, both of which are also incorporated herein by this reference. Arnold provides a lock directory in a single system controller unit (SCU) which handles the entire main memory but in granularity like that of the "CPU cache block" as opposed to providing a single lock bit for each location in the main memory. The directory in the SCU of Arnold is defined by a plurality of lock bits a particular one of which is interrogated to determine if a lock request should be granted, and which notifies a system of indeterminate number of instruction processors (because they may be swapped out for repair, or because the basic design does not change with increase or decrease of processor number), it is an awkward construction to provide a single SCU type controller to funnel all memory lock requests through. Too, with systems that have cross-bar interconnects between each processor and the entire main memory unit, instead of busses between main memory and the instruction processors and their caches, the bottleneck of such an arrangement is not tolerable in its affect on overall performance since it would force all calls for locks on areas of memory through a single pathway.

These Bauman and Arnold patents appear to be relevant to a different level of lock than is this disclosure. The Bauman and Arnold patents are not setting software locks, per se, rather those patents appear to be describing a decision process for which processors may attempt locking-type instructions on the addressed memory.

U.S. Pat. No. 6,148,300, Singhal et al, (incorporated herein by this reference) describes some of the problems associated with locks and how to handle multiple waiting contenders for software locks. While it describes the problems well and the prior art, it handles contention by allocation, rather than managing to avoid some of the problem altogether. Another U.S. Pat. No. 5,875,485, Matsumoto (hereby also incorporated by reference) uses the standard system bus for transmitting lock information and appears to require transmission of all information with a lock when a lock is moved.

Locking-type instructions are indivisible: that is, the processor must be able to test the value, and depending on the results of the test, set a new value. These patents are setting a "hardware lock" to permit the lock instructions to execute indivisibly. When the lock instruction completes, whether it was successful or unsuccessful, the "hardware lock" is cleared. This permits only one processor to execute a lock instruction on one location at a time; multiple processors can execute lock instructions at the same time if the locks are affecting different addresses—or in the case of Arnold-affecting different cache lines.

So, the "hardware lock_" is set and cleared for the duration of the lock instruction. Software still must determine the result of its lock instruction to see if the lock is locked. The hardware lock is "up" ("up" is just a state which can have various other names such as "active" or "set") for just a couple of cycles while the lock instruction executes. A software lock may be up for a few instructions, or the software lock may be up for thousands of instructions. (If each hardware lock instruction is a couple of cycles, then the software lock must be up for twice that long just to lock and unlock the lock, and not counting any cycles for operations on associated data or of instructions streams while the software lock is locked).

Hardware locks and software locks, though closely related, are usually considered very different entities, but identifying the above-referenced patents permits a useful description of the background for this invention.

This patent teaches a way for hardware to allow only one processor to execute a lock instruction on a location at a time and to have hardware know the result of the software lock as one combined operation.

Accordingly, a system for quickly handling lock requests in a multi-tiered memory, multi-processor system where each instruction processor has direct access to the main memory through its hierarchy of caches is desired.

Additionally, in use of two second level cache machines with a central main memory and third level caches, somewhat less than but approximating half the time a memory segment is called for, the item needed is in the distant cache. This causes longer access times and hence a reduction in performance of around 10%. The concern for larger scale machines, with many more instruction processors and many more caches, is that if we see a 10% decrease in performance using two caches, the effect of 16 or 32 caches is very likely to be much worse. Even worse performance can be found in machines where particular areas need to be used over and over by all the processors, such as shared data structure segments that contain commonly used with operating system functions like dispatching queues and buffer allocation functions.

So, there is clearly a need for improvement not addressed in the prior art.

BRIEF DESCRIPTION OF THE DRAWINGS

FIGS. 8A and 8B are different.

FIG. 13 is a block diagram of a preferred embodiment side door for use in an intermediate level cache area in accord with this invention.

SUMMARY OF THE INVENTION

Figure 1:
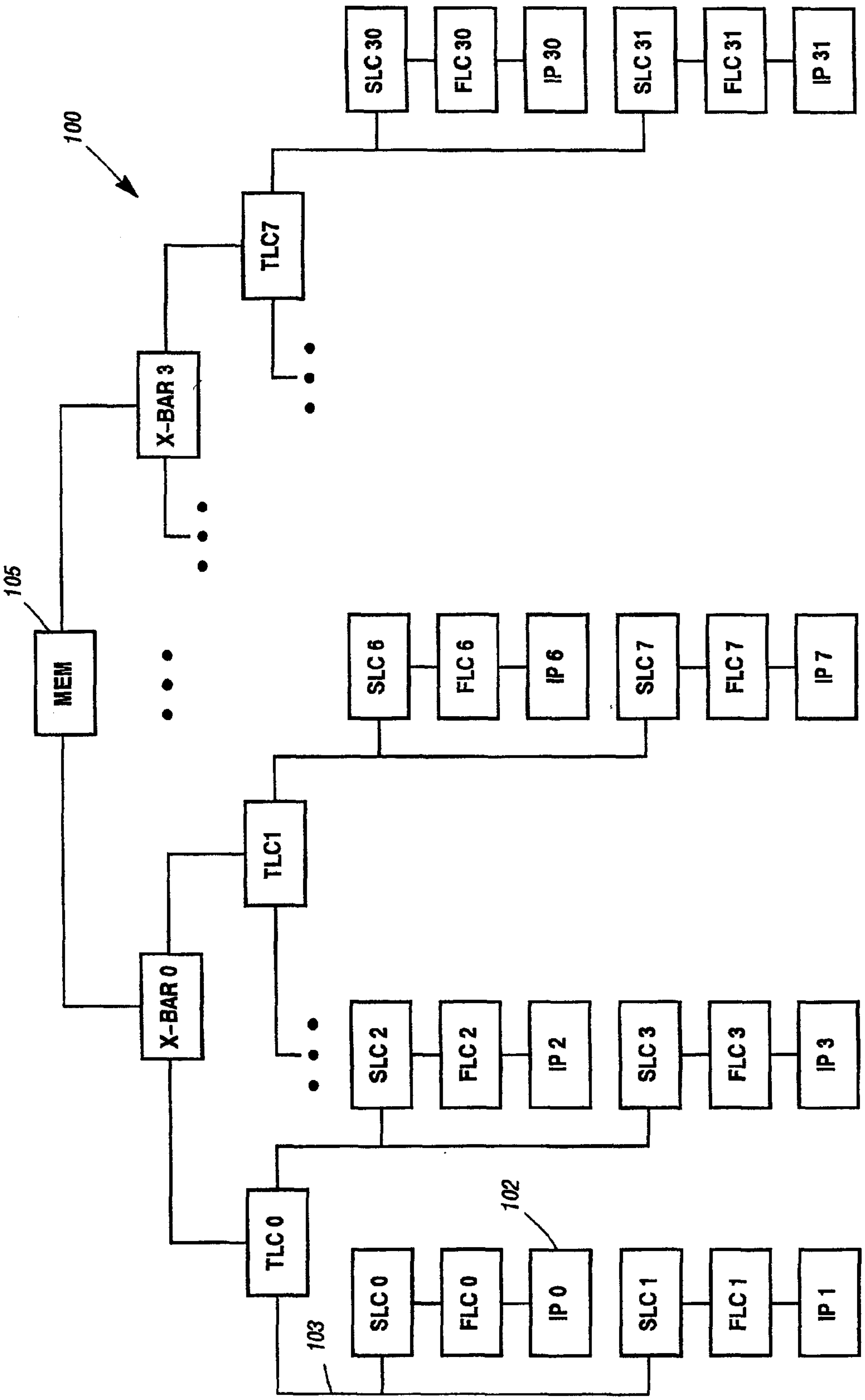
FIG. 1 is block diagram of parts of a multiprocessor system on which a preferred embodiment of the invention can be implemented.

A separate set of procedures, hardware and a redesign of the architecture of multiprocessor systems with multiple levels of cache memory can yield significant processing improvements if done as described in detail below to specifically handle communal locks separately from ordinary locks. The inventors hereof have designed such a system, set of procedures, and described hardware for such purpose to lessen the problems described in the Background section above.

Locks, for the purposes of this document and as generally understood, are a software convention that gives one entity (for examples; a processor, process, program, or program thread) access to a data structure or to a code sequence. The locking entity, once it owns or has the lock, is given access without conflict vis-à-vis any other entity to the data or code represented by the lock. For a processor to use a lock there are typically some set of instructions that can be used by the computer system processors to determine if wanted segments of memory are owned by others and allowing a processor to acquire ownership. Different systems will have different instructions but the ones used here for illustrative purposes are instructive. A Test and Set and Skip instruction may be unique to the Unisys Corporation 2200 computer system family, but Compare and Exchange and other instructions, or ones with similar functionality are required for systems to use locks, and this invention can be applied to various computer systems.

A value (such as a one or a zero for example is used for Test and Set and Skip instructions, but for Conditional Replace instructions the value could be a program-thread-ID or something else) is chosen that represents either "locked" or "unlocked" as a system convention. In various types of computer systems, this value can be kept in a memory location. In order for the locks to be of any use, hardware must implement the various available locking and unlocking instructions as indivisible operations—operations that, once are started, complete without conflict or access to the lock from another hardware element. While this indivisibility is very short and at a hardware level, the software lock that software can set may be locked for as short as a couple of instructions or for thousands of instructions—possibly even for seconds or more.

This invention teaches a new way for software controlled locking and unlocking of memory-resident data structures in a multiprocessor computer system, employing both a hardware architecture and a methodology. First, an extra hardware interface is provided among all participating second level caches to provide a direct path and avoid long latency inherent in going via the normal access structure to another cache to obtain a lock over a segment of data or code. In one embodiment, the entire address range to the caches is mapped as a part of the initiation or set-up process for the partition or the computer system if there is one single partition. Set-up in some systems is done by the BIOS-type program which determines which memory ranges are allocated to which partitions, which processors control which processes and the like. In the inventors' systems, there is a separate processor that handles set-up and this is explained in greater detail with reference to FIG. 11 below. In the preferred embodiments, there is not a "mapping area" per se, as that would be shared data for all processors to access. Suppose, for example, that there are 40 (or 32 or 64) bits of address and 16 Second Level Caches (SLCs). Then one could choose any 4 bits (or 5 bits if there were 32 such intermediate level caches) of the 40 bits of address, and the 4 bits need not be contiguous bits in the 40 bits, to select the particular SLC (SLC0 thru SCL 15) to own a particular communal lock. Obviously, some 4 bits would be better to choose: choosing any bits within the one cache line such as the least significant 3 or 4 bits, would NOT be a good choice since they are common to all cache lines and do not differentiate among communal lock cache lines. (Lock caches typically have plenty of room since there are usually only a few communal locks in a given system so the needed bits should be easily available.) Given this example, the system initialization function (the same system initialization function that determines which processors and memory ranges are available to this particular "partition" of the system (one or more partitions may be supported) defines address bits associated with SLC ownership for mapping the address of a communal lock to the SLC that owns it, and this mapping exists throughout the life of the set-up. A mapping can be had less preferred ways, such as with a dedicated memory area or other hardware or software, but for all the preferred embodiments, this mapping must be available to all processors (caches) such that each SLC knows where a given communal lock cache line should reside. Also, in preferred embodiments the address range for specially marked (that is, data that is marked as leaky (system shared) via the addressing structure (bank descriptor in the 2200; segment descriptor or, possibly, page descriptor in other architectures) describing the data address space and access rights) data is the only range requiring addresses in the map. Also, a "communal data" flag is put in each bank descriptor (mapping area) where the high usage locks will be stored. (Note that not all addressing structures will be marked as leaky; and, of those that are "leaky" (that is, to be aged out of a cache early), only some will be marked as containing communal data. This marking of addressing structures is useful for special locking handling described later in this patent). (For a discussion of how leaky cache data see U.S. patent application Ser. No. 09/650,730, incorporated by this reference herein. Communal locks which are likely to be highly used and thus wanted often by other caches should ordinarily be marked for early aging out, i.e., be "leaky" data).

Data that is resident in a SLC (second level cache) has "tag" information describing something about the data (such as whether the data has been modified, what accesses (read/write), whether the data is "owned" by the SLC). We use the term second level cache although it is to be understood that this first implementation was for a computer system with three cache levels, and that the inventive features could be applied to lower or higher level caches given different systems or other considerations.

In the preferred embodiments there are two kinds of locks: communal and non-communal. Non-communal locks are handled as ordinary data: to update the lock value, the SLC must have ownership of the cache line containing the lock. Communal locks are handled specially and are the subject of this patent. There are very few communal locks but they constitute a very large percentage of the lock requirements for the partition or the system, and therefore deserve the special treatment given here, since by handling them separately and specially, overall partition or system throughput is enhanced.

Communal locks are determined by the operating system. Schedulers and dispatchers that will be called by every software process needing resources of the computer system, shared as a whole, will typically be mapped as communal locks. In accord with our preferred embodiments, Communal locks do not move from SLC to SLC. Every SLC knows which SLCs own which communal locks because each SLC knows the mapping mentioned above. In the preferred embodiment, each SLC has a separate area for the mapping of communal locks to SLCS. Each SLC has separate areas for the directory of communal locks ft owns and for the values of the locks themselves. (These last two areas are similar to the directory and cache the SLC has for data). The "Communal" lock flag will direct the hardware to use the mapped caches when a process calls for a communal lock. Most data and locks are not communal and use the existing caching mechanisms; however, as alluded to above, the communal locks represent a disproportionately high percentage of the lock conflicts encountered in actual operation.

Additionally, a non-standard locking to send-the-function-to-the-data method instead of the normally used send-the-data-to-the-function method of organizing processing power in a multiprocessor system can be employed, preferably just for handling communal lock requests. In such a system, a lock command is sent from the processor to the cache along with the necessary arguments instead of reading the data from memory into the processor, doing the test and conditionally writing the updated information back to cache lock value. This has the effect of reducing the hardware utilization of the memory busses because the system does not have to send the data to the processor to do a lock, rather the cache is asked to attempt the lock and report whether the attempt was successful.

Response time to the requester is therefore improved by reducing the number of processor-cache "trips" required to accomplish get-lock or get-data types of instruction. Compare the request, read and write-three trips between the processor and memory, while with a lock command and the status of success or failure; two trips are all that is needed.

By attempting the lock command in the cache, the overhead associated with sending a copy to a cache and then having to keep track of where the copies are is avoided. In addition, we expect a nearly perfect hit rate on the lock in its mapped cache since a separate cache area for locks prevents ordinary data from forcing an aging-out (by overwriting) lock data. ("Lock data" being the value of the lock).

Just as some cache implementations use separate caches for instructions and for data, a special cache for communal locks as we are providing here in our preferred embodiment, has two advantages. First, locks would not be aged-out of cache due to associativity conflicts with either instruction cache lines or data cache lines. Second, a lock cache can be quite small and still very effective since there are only a relatively small number of communal locks in any system. Locks are associated with data structures. Since locks are each a definable entity (for example, a 36 bit word in the preferred embodiment), the associated data structure must be at least as large as the lock, and the size of the associated data structure may be unrelated in size, perhaps hundreds of times the size of the actual lock. After locking a lock, the processor will, typically, access the associated data structure (e.g., bring at least parts of that data structure into cache). Since locks themselves are small in size, then a lock cache is much smaller than the data cache.

Thus, in our preferred embodiments the locks are separated from the data. For at least those locks which will be most commonly conflicting or contested by lock-using entities, we will call such locks "communal" locks. For communal locks, in the preferred embodiment a "communal" flag is set in the Bank Descriptors for the banks containing the high usage locks. Readers may employ instead of the "bank descriptors" which define specific banks of memory in Unisys system computer systems, "segment descriptors" for segments or "page descriptors" for pages, but we believe that in our memory organizational structure the banks are the appropriate level for the preferred embodiment communal flag settings. It may be possible to have all communal locks defined in a certain area in which case there would no need for a flag in the Bank Descriptor (in the addressing structure) since the area would be known. Such a scheme would not be very flexible however and particularly difficult to implement in a system that supports partitioning. Suppose such a system needed to add more communal locks, where would it put them? And if such a system had very few communal locks, then it could not use the leftover memory for anything else.

Whether the data associated with each communal lock is in a bank marked with the Leaky flag is an independent choice. If used, a Leaky flag returns data from cache to a higher level cache or to main memory quickly to allow other cache memories to have faster access to the data since distant caches provide slower access on some systems (particularly large multiprocessor systems, an example of which would be the Unisys ES 7000). (In our way of thinking main memory is the highest level of memory and the FLC is the lowest, though it is recognized that others describe their systems in the opposite manner). The Leaky bit implementation presently preferred (if used) is described in detail in U.S. patent application Ser. No. 09/650,730, titled "Leaky Cache Mechanism" owned by the assignee hereof, and incorporated in its entirety herein by this reference. (A Leaky cache promotes efficient flushing of data from caches, generally. The specific implementation in the '730 application can be described as follows. The Leaky cache is an apparatus for and method of improving the efficiency of a level two cache memory. In response to a level one-cache miss; a request is made to the level two cache. A signal sent with the request identifies when the requester does not anticipate a near term subsequent use for the request data element. If a level two cache hit occurs, the requested data element is marked as least recently used in response to the signal. If a level two cache miss occurs, a request is made to level three storage. When the level three storage request is honored, the requested data element is immediately flushed from the level two cache memory in response to the signal.) The leaky bit and the communal bit can be set for Bank Descriptors.

For background, it is noted that in preferred embodiment computer systems there are bank descriptors. Bank Descriptor are kept in memory and maintained in memory and they are accelerated into hardware (that is, taking advantage of special registers or other programmable hardware configurations for enhanced access and usage speed) in almost all implementations to improve performance very similarly to how page descriptors are maintained and accelerated. Many computer systems do not use bank descriptors but segment descriptors or page descriptors alone. These can be substituted where bank descriptors are referred to in the preferred embodiments, but we believe the memory organization sizing is most convenient when bank descriptors are used.

In the preferred embodiments, then, the software at set-up will be made clever enough to put all the communal locks into one or more Banks.

Continuing with this background, individual instructions typically refer to a byte or a word at a time. The hardware may bring a cache line to the cache at a time in hopes that locality of reference in locality of time will make it worthwhile to have brought in extra data. In a similar manner, software brings in a page of data/instructions at a time from mass storage to memory and a page is many cache lines. A Bank Descriptor in preferred embodiment computer systems holds information that is common to multiple pages (such as access privileges, mass storage location (if any) and so forth).

Even using this invention the data structures associated with a lock can be handled, as they normally would be within the computer system. They will typically be bounced (i.e. transferred, moved, or sent) from cache to cache as a function of usage by the processors employing those caches. For high usage locks and data structures, if they are designated as communal and take advantage of the inventive features described herein, the locks will be accessed more often than the data, thus exercising the inventive concepts often and resulting in a substantially more effective processing system. Where high usage locks are not designated as communal at set-up, processing them will be an impediment to high throughput.

Many other features and limitations are described in the detailed description below.

DETAILED DESCRIPTION OF THE PREFERRED EMBODIMENTS

The preferred embodiment for implementing the invention herein is in a computer system similar to the ES7000, produced by Unisys Corporation, the Assignee of this patent. However, one of skill in this art will be able to apply the disclosure herein to other similarly architected computer systems. Existing ES7000 cache ownership schemes provide for access to any cache line from any processor. Other multiprocessor machines have what may be thought of as similar or analogous cache ownership schemes, which may also benefit from the inventive concepts described herein. There are up to 32 processors in the current ES7000 System, each with a first and second level cache. In the ES7000, there is a third level cache for every four (4) processors. The third level cache interfaces to a logically central main memory system, providing a Uniform Memory Access (UMA) computing environment for all the third level caches. (There is however, no inherent reason the inventive concepts herein may not be applied to Non-Uniform Memory Architecture (NUMA) architected systems as well.)

However, the access time to a cache line depends on where the cache line is relative to the requesting processor. If the cache line is in a processor's own second or third level cache the access time is good. The access time grows as the requested line is in the main memory or in worst case in a distant second level cache.

Refer to FIG. 1 in which a simplified representation of the relevant components of a computer system organization 100 that could be used with this invention is shown. The computer system memory hierarchy includes a main memory, which in the ES7000 will contain at least one memory storage unit (MSU) that has directory and data storage arrays within it. The MSUs form the "main" memory of the computer system. The exemplary computer system 100 also has a number of third level caches (here showing only three (3): TLC0, TLC1, and TLC7, the ellipses indicating there may be at least 8), a number of second level caches (eight (8) shown here: SLC0, SLC1, SLC2, etc.), and a number of first level caches (eight (8) shown here: FLC0, etc.). In turn, these first level caches provide interfaces to instruction processors IP 0–n, respectively. When a processor, say IP0, wants to find some data address (the address is within a "cache line"), the delay to check its first level cache (FLC0, for this example) we shall presume is 0 cycles. (The 'cycles' listed here are relative average numbers of cycles (or relative average times) with 0<AA<BB<CC<DD<EE. Different computer systems and machines will have different relative cycle times and different length cycles so it is believed the most sensible way to describe this is with the relative list of amounts of time required from 0 to EE.) To go to (i.e., get a cache line for the processor IP0) the second level cache, SLC0, takes AA cycles. If the sought-after cache line is not in the second level cache SLC0, the way the architecture in this machine is set up it takes BB cycles to check the third level cache TLC0) and retrieve the wanted memory segment from the third level cache. If the request has to go into the main memory (MSU), A CC cycles are required. If the memory segment is held by another third level cache (say for example TLC 7), then DD cycles are required. If the cache line is at a second level cache (for example, SLC 30), EE cycles will be required.

Having acquired a cache line to lock a lock, the processor may find on examination of the cache line that the lock in that cache line is already locked. When Instruction Processor IP30, which locked the lock, wants to unlock the lock, it must spend the same EE cycles in this computer system to acquire the cache line back from IP0 so IP30 can unlock the lock thus taking 2 times EE to accomplish this simple function in the ordinary course. If the processor IP0 has to do this several times to get on with its program because it has to wait for IP30 to complete it's task on the locked data, one can easily see how this spinning and ping-ponging on a single lock between processors across the architecture can lead to unwieldy time delays and consequentially slowing down overall processing of the computer system.

Figure 2:
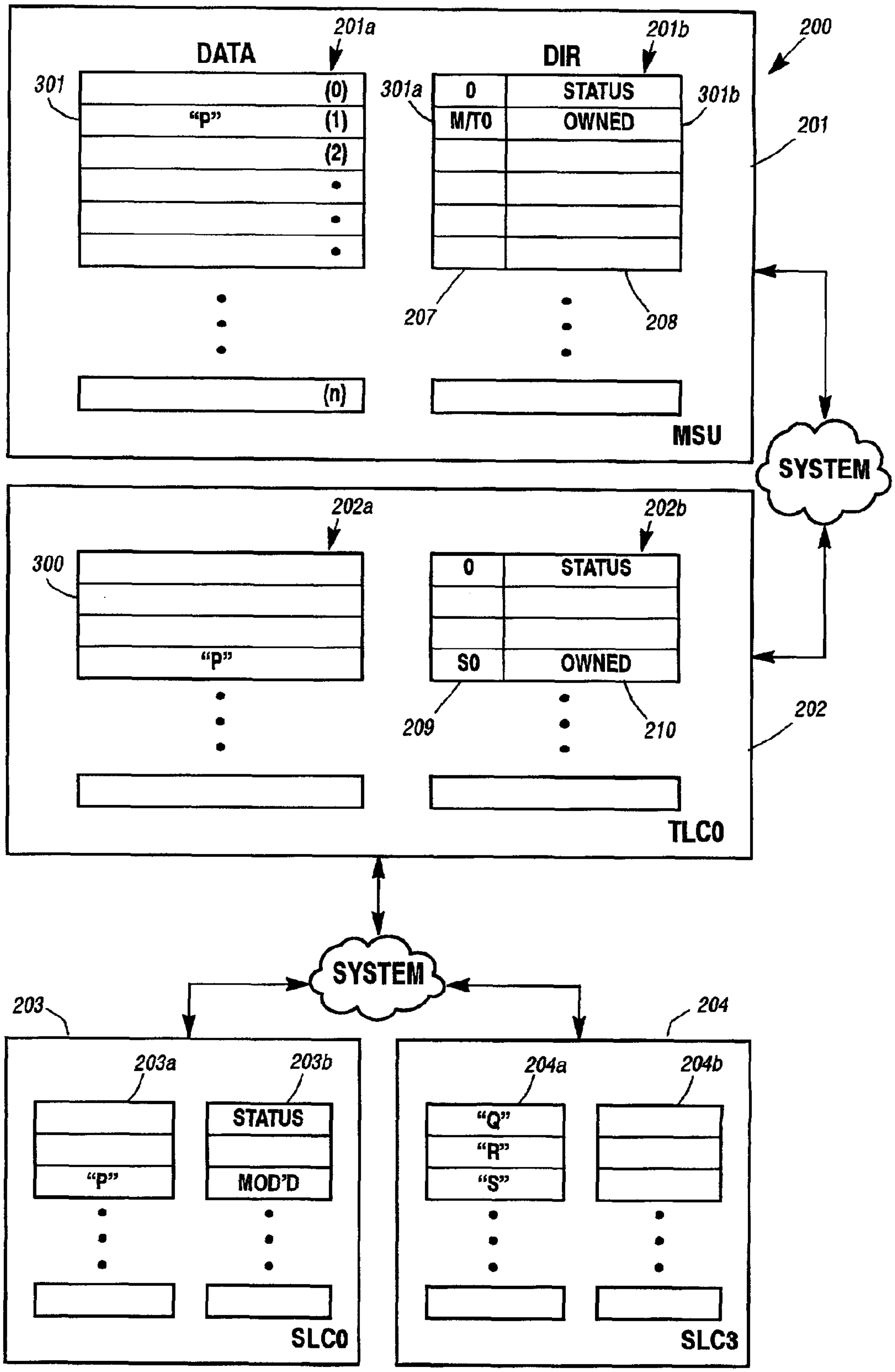
FIG. 2 is a block diagram representing levels of memory directory hierarchy.

Although it may not be unique to the ES7000 architecture, another relevant structure is the directory structure in this architecture. Here, as seen in FIG. 2, a three-level directory structure provides the location of every cache line. In the main memory directory (in the MSU(s), the memory knows which cache lines it owns and it knows that a third level cache or its dependent second level caches own a cache line. The third level cache directory knows which cache lines it owns, but it may not know all the cache lines its second level caches own (the third level cache is called "non-inclusive"). Each second level cache knows what cache lines it owns (thus, such a cache is sometimes called "inclusive" with respect to cache line ownership knowledge).

This multi-level memory and directory structure 200 as used in the exemplary computer system is illustrated in FIG. 2. The MSU level memory unit 201 (of which there may be several in the main memory 105 of FIG. 1) has a memory divided in two parts, 201*a* and 201*b*, containing the data and the directory system memory, respectively. While physically it may not need to be divided into address lines equivalent to cache lines, we assume that to be the case here for heuristic purposes, so line 301 contains a single cache line as does each of the other blocks ((0), (1) . . . (n)) illustrated in the Data area 201*a*. Corresponding to each cache line is a directory line in directory 201*b*, having an ownership indicated here as either one of the third level caches (T1–T7, corresponding to TLC1–TLC7) in area 207. The state of the cache line (clean, modified, owned, et cetera) is indicated by the data in the "status" area of the directory 208. (For directory line 301*b*, the status is owned/modified/T0).

The Third Level Cache itself has a similarly segmented memory with a cache line area 202*a* and a directory area 202*b*. Here again the directory has information on ownership (209) and state (210). The ownership indicated is either self or one of the SLC's below it in the hierarchy, so for (using the illustration of FIG. 1) TLC0, there is an SLC 0, and SLC 1, and SLC 2, and an SLC 3 which could have an ownership indicator in area 209, as well as the TLC ownership indicator if desired. In this illustration data "P" is owned by SCL0, so it says S0 in area 209 at the address corresponding to 300 in data memory area 202*a*.

A cache line may have data (or Instructions) to which it has Shared or Read-only access. The SLC knows those cache lines are in the cache. The SLC also knows if it "owns" a cache line. An SLC may not modify the data in a cache line unless it owns the cache line, but it may own the cache line and not modify it. Besides Shared or Read-only, the status of particular cache lines (independent of "owned") may be "Modified" or "Invalid" (Invalid cache lines are available for caching a cache line).

Second level or mid-level caches 203 and 204 are also connected through system interconnects into the third level caches as shown here and in FIG. 1, and each of them also contains data memory (203*a* and 204*a*) and status directories (203*b* and 204*b*).

Typically, first level caches feed into the second level caches of a processor consistent with FIG. 1, thus completing the overall description of the memory structure in a preferred embodiment system. Other multi-stage computer system memory organizations where a mid-level cache is used can advantageously employ the invention as will be apparent to one of ordinary skill in these arts upon reading this description in full, and it is not meant to be limited to only the preferred embodiment but may be used together with many designs, that meet these criteria.

Thus, the main memory 201's directory 201*b* and cache line storage array 201*a* are shown, as are the directories 202*b*, 203*b* and cache line memory array 202*a* and 203*a* areas of the third level and second level 202 and 203 caches, respectively. Additional structures are used for communal locks, which will be described infra. The directories of the MSU and TLC have both state or status information and ownership information for each cache line they contain, and the SLC also has status and ownership information for its cache lines in its cache. An SLC cannot attempt to modify a cache line unless the SLC owns the cache line.

Here is a brief example of the workings of the non-inclusive, third level cache directory applied through FIGS. 1 and 2, 2A and 2B. Suppose IP0 (102 of FIG. 1) requests a cache line "P" with exclusive ownership (that is, it intends to modify the cache line). Further, suppose the cache line P is shown in the directory of MSU 201 to be owned by MSU 201 at the time of the request. The memory directory (like 201*b* of FIG. 2) changes the ownership of a cache line by modifying its directory (here at line 301 by changing the indicator in 301*a* to show TLC0 as the owner of cache line P, and updating the status area 301*b* of line 301. The directory in TLC0 (for this example, 202*b* of FIG. 2) notes (300) that cache line P is owned by SLC0. The directory 203*b* in SLC0 knows that it owns cache line P, and the status of that cache line is "modified". (SLC0 does not mark "P" as modified until it actually updates P.)

Now suppose that IP3 requests some cache lines Q, R and S that happen to associate to a same translation look-aside buffer as cache line P. The memory directory 201*a* (cache lines 303–305, FIG. 2A) lists TLC0 as the owner of cache lines Q, R and S. The directory in TLC0 notes that cache lines Q, R and S are owned by SLC3. Now, suppose IP 3 requests cache line T that also happens to use the same hash to the same translation look-aside buffer and suppose the look-aside buffer is 4-way associative. The TLC-0 does not have a place to hold T (the hash allows just four); so, TLC-0 discards the oldest entry in the associated translation look-aside buffer (which happens to be "P"). For the purposes of FIG. 2B, therefore, TLC0 "forgets" that SLC 0 also owns cache line P in such circumstances and this "forgetting" must also be handled in implementing the invention. (FIG. 2B illustrates the state of TLC0 and SLC3 after T has been captured by them.) This "forgetting" can occur due to aging-out of old cache lines, implementation of leaky cache routines, or hashing that requires space to overwrite old data. So, to restate the obvious, after TLC0 forgets it owns P and becomes owner of T, SLC3 204 knows that it owns cache lines Q, R, S and T, and SLC0 203 knows it owns cache line P.

Figure 2A:
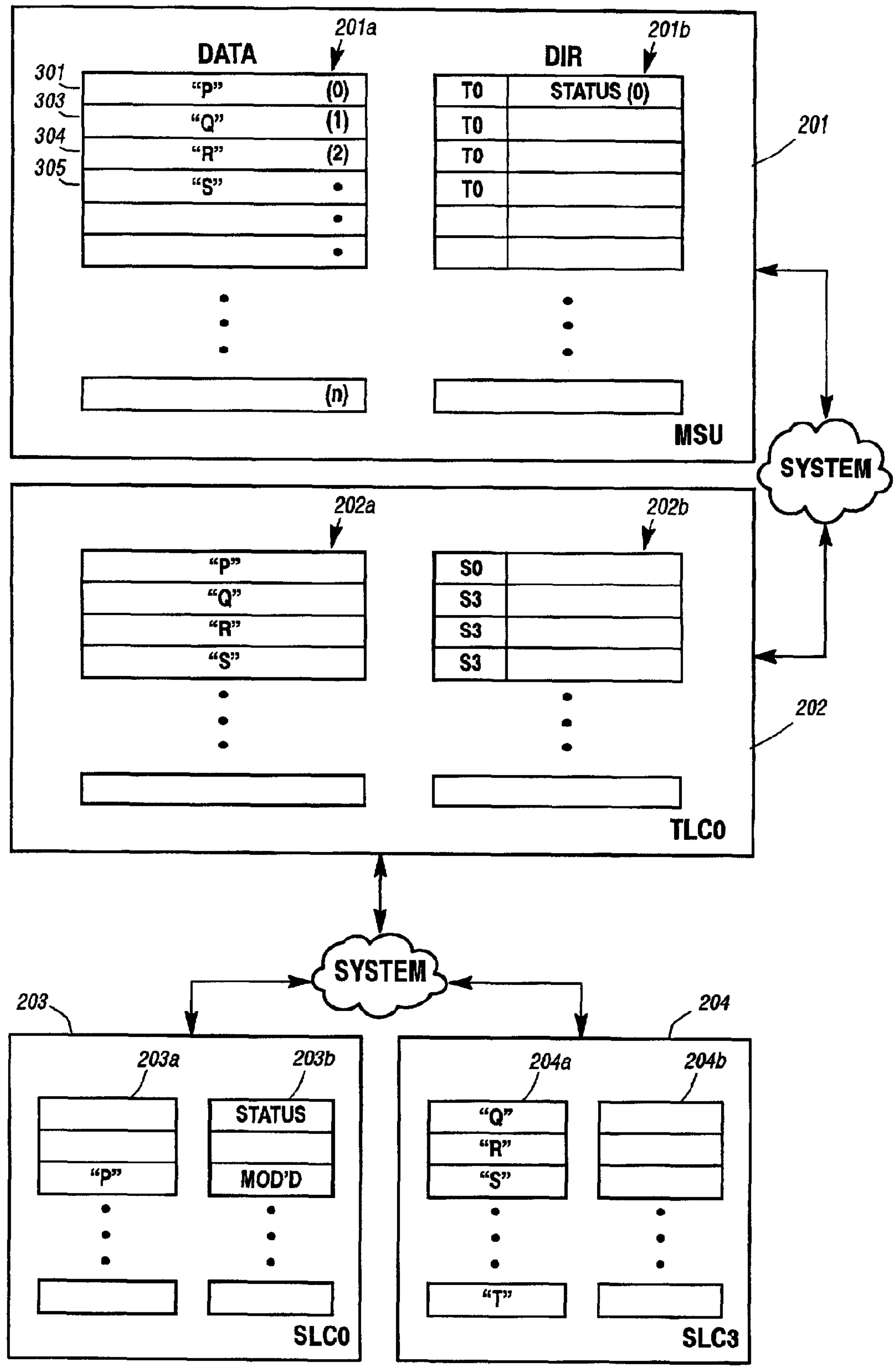
FIG. 2A is block diagram with the same components of FIG. 2 having different data in memory.
Figure 2B:
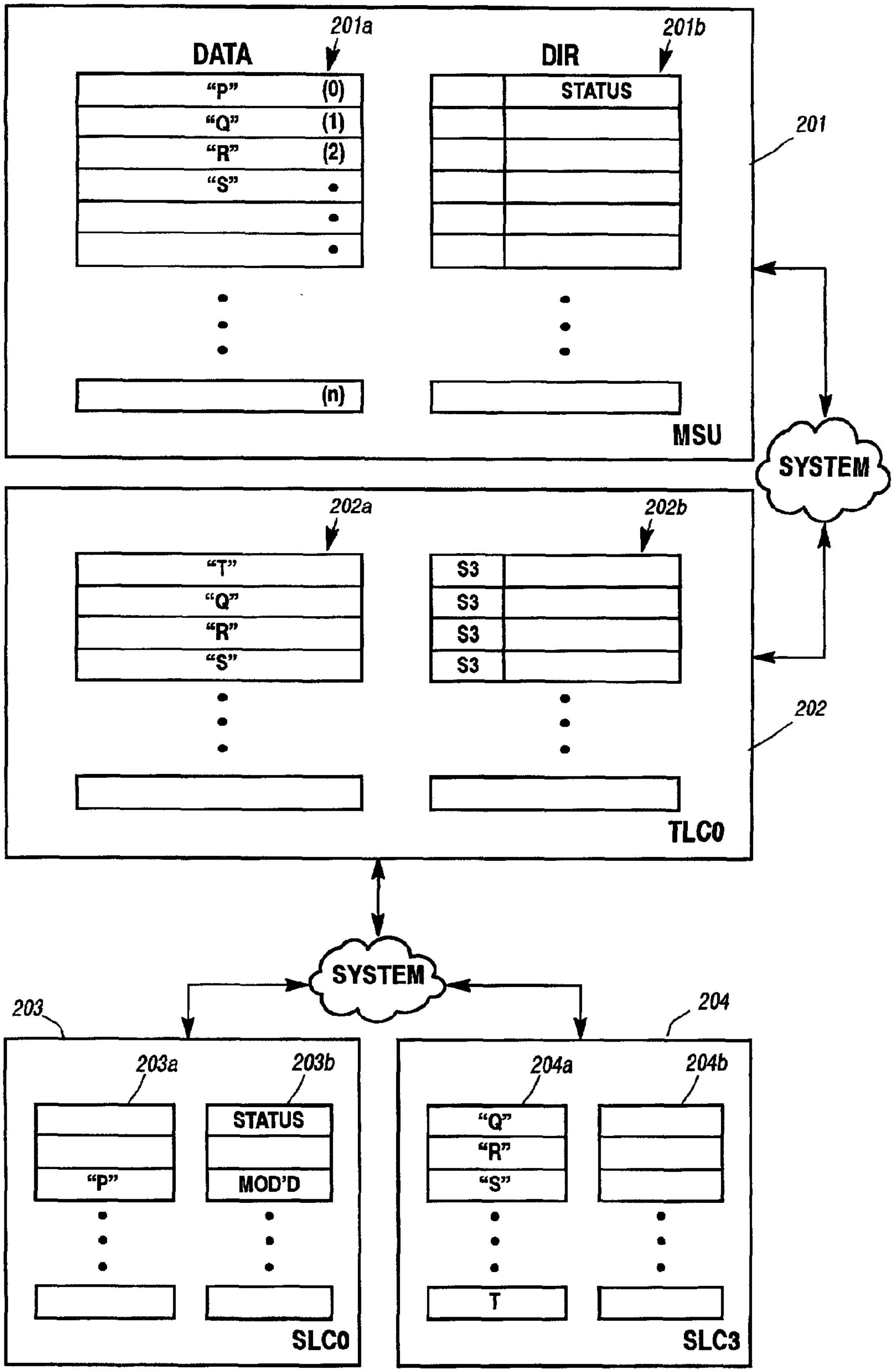
FIG. 2B is a copy of FIG. 2A with a different memory state from that illustrated in FIG. 2A.

Now, if another IP, say IP6 requests cache line P, its request propagates from SLC 6 to TLC1 and from TLC1 to both TLC0 and to memory (MEM 105 in FIG. 1 which contains MSU 201 in FIGS. 2 and 2A). The MSU sees in its directory that P is owned by TLC0, so if the request goes through memory it will be forwarded to TLC0. (In preferred embodiments the TLC0 will be checked directly without going through memory. The data path is much shorter from TLC0 to TLC1 through the cross-bar (XBar 0) than having to go from TLC0 to MSU and then go from MSU to TLC1, so computer systems that have such data paths available should take advantage of this savings.) TLC0, if it has forgotten P from its directory (as described above) will not respond to the request from TLC1 because TLC0 "forgot" that SLC0 owns cache line P. When memory (the MSU) receives the request, its directory (201*b*, line 301, area 301*a*) indicates that TLC0 owns cache line P; therefore, the MSU directs (or requests, but TLC0 has no choice) TLC0 to supply cache line P to TLC1. When TLC0 receives the order from memory to supply cache line P, it asks its 4 SLCs to supply the cache line P. SLC0 responds with the data to TLC0. TLC0 sends the cache line P to TLC1 and tells memory that it has passed cache line P to TLC 1. Memory will update its directory to record that TLC1 owns cache line P. The directory in TLC1 will note that cache line P is owned by SLC6. And the SLC6 directory will note that it owns cache line P. Thus, while the non-inclusive third level cache eventually provides the proper cache line, it is slower responding than if it "remembered" the cache line was owned by one of its SLCs.

For comparison, suppose SLC6 requests cache line R. It sends the request to TLC1. TLC1 sends the request both to memory and to TLC0. TLC0 notes from its directory that SLC3 owns cache line R. TLC0 requests cache line R from SLC3. SLC3 provides cache line R. SLC3 updates its directory to no longer own cache line R. TLC0 sends cache line R to TLC1 and tells memory that it sent cache line R to TLC1. TLC0 updates its directory to no longer own cache line R. The memory directory is updated to show that TLC1 owns cache line R. TLCL updates its directory to show SLC6 owns cache line R as it passes cache line R to SLC6. SLC6 updates its directory to indicate that it owns cache line R.

So let us summarize the limitations of the multilevel cache structure for handling locks as ordinary memory as described so far in detail above. Thus, a lock in a cache line is known to exist by the memory system in a single one of all the possible third level caches, second level caches, and MSUs by the memory system. However, the MSU directory (at least in similar memory system architectures to the ones described here, such as for one example, the MESI-type multi level systems IBM is known for,) does not know which, if any, of the second level caches under it might have the sought after cache line (with the lock) because its directory, in the preferred embodiment, only has information on the eight third level caches. The third level cache might, or might not, know that one of its second level caches has the cache line. The owning second level cache does know that it owns the cache line. No element in the memory system knows whether any data in the cache line is interpreted as a "lock" and much less that such a lock is locked by a particular IP giving that IP access to some code or data without any other IP accessing that code or data at the same time. Only the "locking" IP can release the lock (by changing the lock value in its second level cache). If another IP wants to lock the lock, it must first obtain, with the intention to modify, the cache line containing the lock. Thus, the IP wanting to lock the lock must send a request up through the memory hierarchy for ownership of the cache line. The owning cache gives up ownership of the cache line and sends the contents of the cache line to the requesting second level cache. When the requesting processor's second level cache receives the cache line (owns the cache line), the processor can attempt to lock the lock. If the lock is not locked, the attempt operation (i.e., one of those indivisible lock instructions) locks the lock. If the lock is already locked by another IP, the operation fails and indicates to the requesting processor that the lock was already locked.

With this in mind, it takes little imagination to see how time- and resource-consuming obtaining cache lines that are commonly used and locked would be with respect to a much asked for and often locked memory segment or cache line. Examples of such segments would be those containing locks for system shared resources such as system shared process dispatch queues, shared page pools, and shared database control information.

This invention teaches a different method for handling locks, which saves many cycles over time compared to the method just described. In the preferred embodiments it also allows the just described method to continue to exist for all normal data and lock handling except for communal lock functions.

Figure 3:
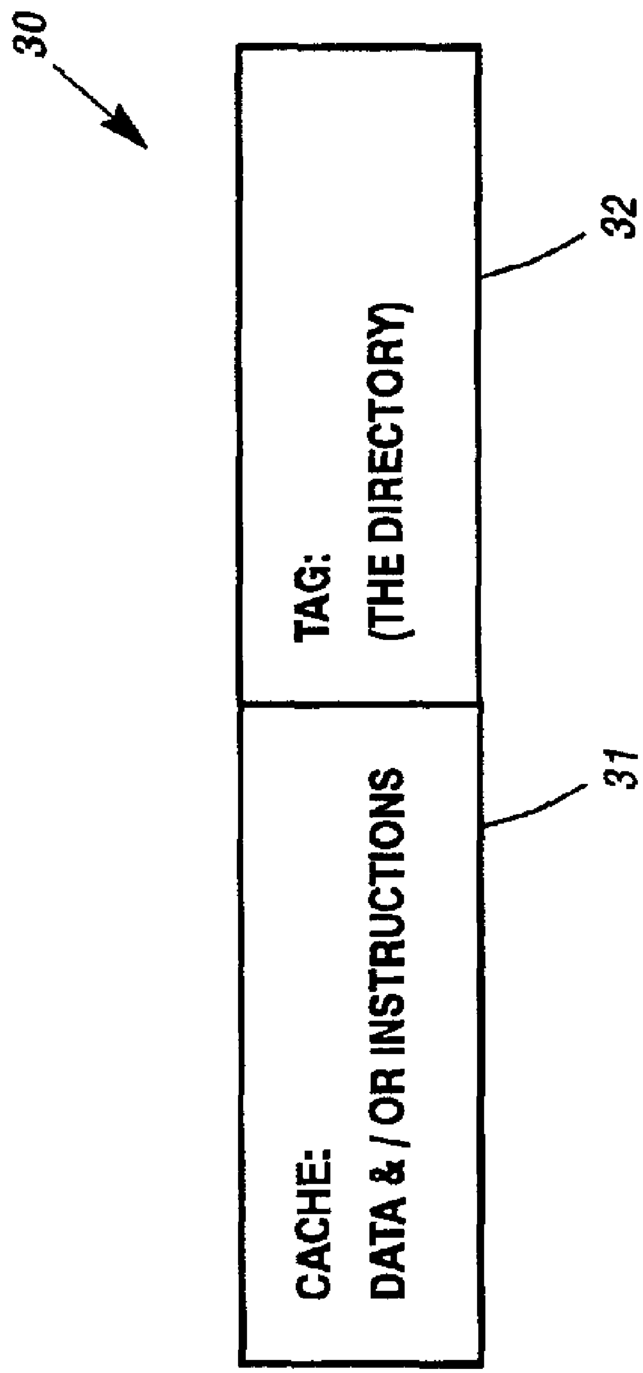
FIG. 3 is high-level block diagram of an ordinary cache.

FIG. 3 shows the two major elements of an ordinary cache 30: the actual cache of instructions and/or data 31 in the cache and the tag 32, which is the directory. The line, of information relating to a cache line, which is in the directory at any given memory level, is generally called a tag. This includes the information kept in the directory structures of the memory structures described above, such as directory 201*b* for the MSU, 202*b* for the TLC and 203*b* for the SLC. The ownership reference information in the directories of the MSU and TLC may be found in the tag.

Figure 4:
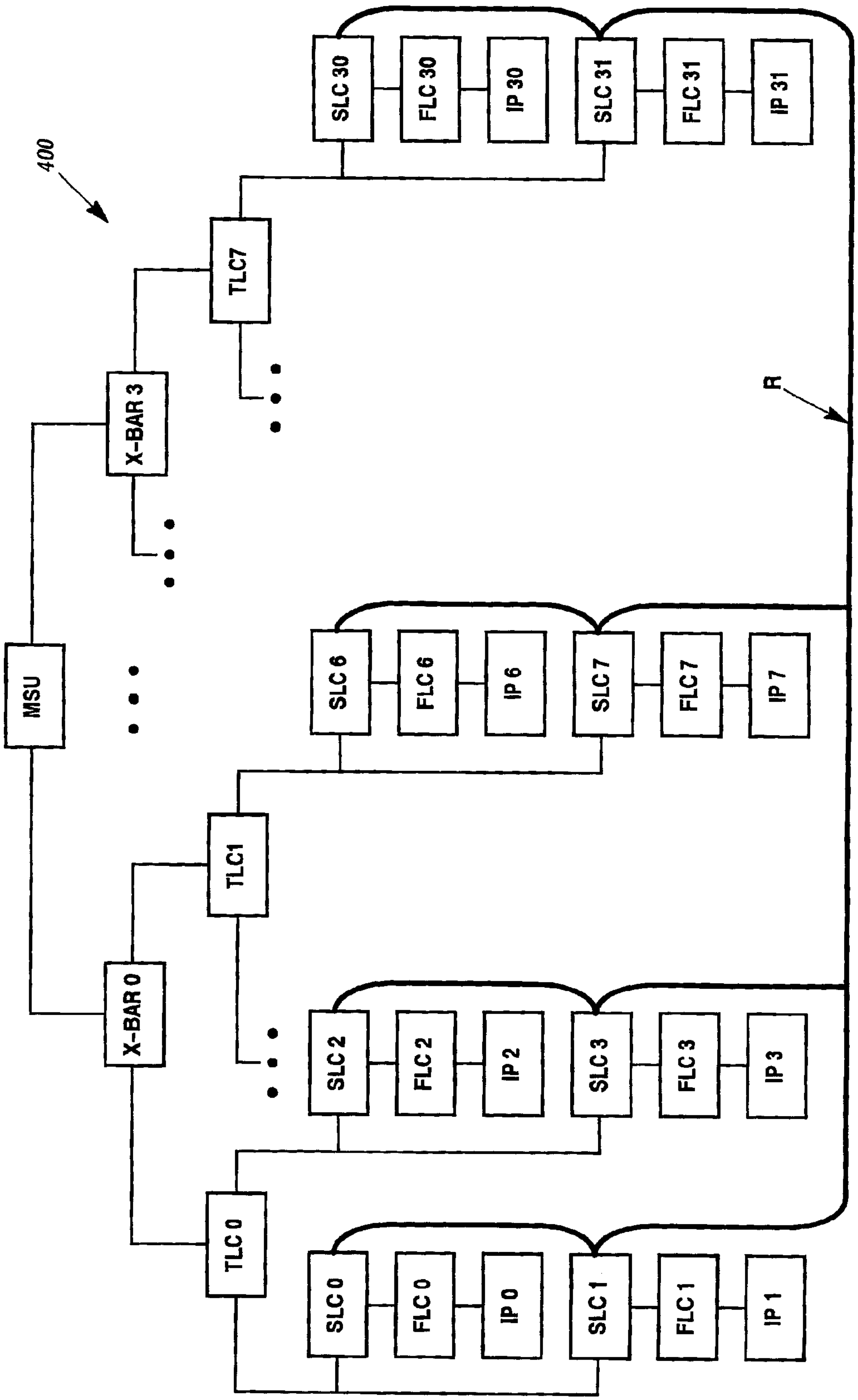
FIG. 4 is a high-level block diagram of the parts of a multi-processor system including a locking interface.
Figure 5:
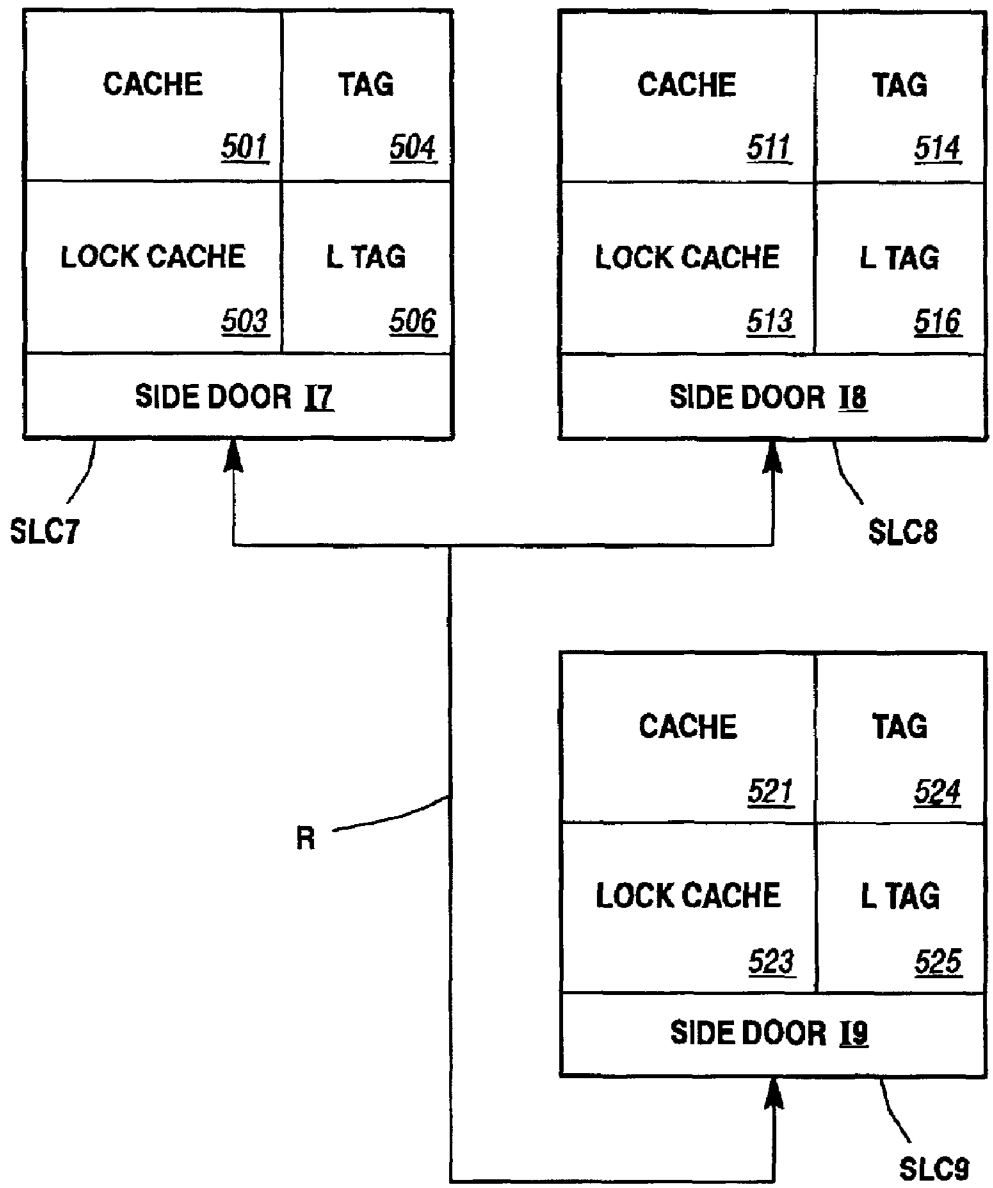
FIG. 5 is a high-level block diagram of three-second level caches with locking structures.

FIG. 4 shows how the overall architecture 400 is changed in preferred embodiment computer systems to allow communication along a "radial" path R, through "side doors" (active connections) to the SLCs 0–31 (second level caches). This radial can take several forms. It could be a bus structure as is shown in FIG. 5, and the relevant data can be transferred to all SLCs via a broadcast-like mechanism through the bus (i.e., putting signals on the bus for the intended recipient to use); it could be implemented as a pathway that operates like a serial shift register threaded through the SLCs through which messages are passed; or it can be a point-to-point channel from each SLC to its two neighbors. (It is also possible to construct this "radial" as some combination of these types of data pathways, or through other well-understood means, including for example RF broadcast). These side doors then provide an alternative path for communicating lock information from the normal data communications paths used in prior art devices, and in the preferred embodiments accommodate the communal locks efficiently. The cache and the tag can remain the same as described with respect to FIG. 3, so this structure is transparent to the software. A Lock Directory is provided in each second level cache in the preferred embodiment that identifies the locks that are held by each second level cache. A lock cache contains the cache lines owned by this second level cache. The side door for lock requests and the communication link R represent the radial or bus interface connecting the second level caches used by this invention for handling communal locks.

Although not as efficient for locks, the actual lock data could be implemented in the data cache using the tag directory rather than in a separate lock cache with its lock tag directory. Thus, the FIG. 5 illustration provides a view of the logical components of this invention in only one particular hardware configuration.

For locking-type instructions, i.e., those instructions that perform an indivisible-read-optional-modify-write operation, whether doing "Test and Set and Skip" or doing "Compare and Exchange" (or other similar operations in similar computer systems to the preferred embodiment example) the operation is an indivisible-read-optional-modify-write operation. To do these operations on "communal" locks, the inventive system will use the capabilities illustrated in FIG. 4 et seq.

FIG. 5 illustrates three Second Level Caches (SLC7–9 in FIG. 5), each having four data-containing components (preferably, memory arrays or logical memory arrays) to perform the functions described herein. Each SLC also has a side door for lock requests, which interfaces with the radial R, which can be a bus, or direct communications structure as mentioned above, preferably, to allow all the SLCs to pass communal lock functions in the preferred embodiment computer systems. As in the earlier illustrated SLCs in FIGS. 1, 2, 2A and 2B, there is a cache for data and/or instructions (501, 511, 521 for SLCs 7–9, respectively), and an associated tag area or directory (504, 514, 524) in each SLC. This embodiment calls for two additional memory components (which as mentioned just above could be combined into the two extant physical memory arrays if desirable), including a lock directory (506, 516, 526) having the lock tags for any communal locks currently owned by the SLC, and a communal lock cache (503, 513, 523) having lock data associated with each owned communal lock. The side doors are labeled 17–9 and are connected to the radial R.

In the preferred embodiment, for example, the most popular, high contention (communal) locks are locked via a so-called "Test and Set and Skip" instruction, but other computer systems may have several or other similar instructions which perform similar functions. For example, the preferred embodiment computer system also has other locking instructions, such as Conditional Replace, which functions like Compare-and-Exchange on other systems. To take an example, the Test and Set and Skip instruction examines bit 230 of an addressed memory location. If bit $\mathbf{2}^{30}$=1 (the chosen value meaning "locked" in the preferred embodiment), execute the next instruction because the lock tested as "set". If bit $\mathbf{2}^{30}$=0 ("unlocked"), set bits $\mathbf{2}^{35}$–$\mathbf{2}^{30}$:= 000001binary (i.e., make them into a "locked" indicator) and skip the next instruction. (One of ordinary skill in this field will recognize that any value could be used and that address space size is variable across computer systems).

Those high contention (communal) locks in the preferred embodiment system are unlocked via a "Test and Clear and Skip" instruction. The Test and Clear and Skip instruction examines bit $\mathbf{2}^{30}$ of the preferred embodiment addressed memory location. If bit $\mathbf{2}^{30}$=0 ("unlocked"), execute the next instruction. If bit 230=1 ("locked"), set bits $\mathbf{2}^{35}$–$\mathbf{2}^{30}$:= 000000binary ("unlocked") and skip the next instruction. To put this more generally, in an ownership cache environment (including such as may use non-communal locks), the instruction and caching work as follows. An instruction asking for exclusive access causes the second level cache to be loaded with the referenced cache line with exclusive access. The cache line may have already been resident in the second level cache, it may have been resident in one of the third level caches, it may have been resident in one of the other second level caches, or it may have been resident in memory (MSU) as we have illustrated our preferred computer system memory organization. The time required to acquire the cache line depends on where that cache line was resident at the time of the request. Also, since the request was for exclusive access, all other copies of the cache line in third level caches, second level caches, and memory are invalidated. (Different computer systems provide different ways to invalidate but to keep coherency afforded by some kind of invalidation is needed to allow one processor to write to a memory segment. Some computer systems use a snoop, or a broadcast system, and some use a directory updating system, and there are hybrids as well. There is no inherent reason this invention will not work with any such systems since the value is in how the communal locks are discovered and handled quickly and efficiently, regardless of the coherency scheme employed in the computer system in which the invention is used.) If the addressed word (in the cache line) was "unlocked", "lock" the word. Whether the word was locked" or not, the second level cache has the only valid copy of the cache line because it asked for the right to modify it (exclusive access) and the other copies that may have been in the computer system were therefore invalidated. The requestor retains the cache line until it ages the cache line out (to its associated third level cache or to memory, with or without use of a Leaky cache system) or until another requestor requests exclusive access to the cache line (either to "unlock" the cache line or to attempt to "lock" the cache line). Thus, when a program executing on a processor whose SLC owns a cache line, i.e., a requester is ready to unlock the lock, if the second level cache does not still have exclusive access to the cache line, it must request exclusive access to the cache line, invalidating all other copies in the system, and then unlock the lock. If the second level cache still has exclusive access to the cache line when the program is ready to unlock, it "unlocks" the lock.

In this scheme, when IP7, for example (referring to FIG. 4), is attempting to lock a lock that has already been locked by IP30, SLC7 requests the exclusive access to the cache line containing the lock, the copy of the cache line is sent from SLC30 to SLC7. IP7 finds the lock already locked it is unable to use the cache line, but SLC7 now still has the only valid copy of the cache line (because in asking for it with exclusive access, all copies in the system were invalidated, in the ES7000 system by changing the status bit(s) in the MSU directory system for the cache line, but in other systems by a snoop or broadcast methodology as will be understood by practitioners of these arts). When IP30 wants to unlock the lock, SLC30 requests exclusive access to the cache line. SLC7 sends the cache line (back) to SLC30. IP30 unlocks the lock. This sequence therefore twice sends a request for the cache line and twice sends a copy of the cache line. As explained earlier, this requires substantial cycle time to accomplish especially here where the bounce is between distant second level caches and needs to have occurred two times just in this simple example at a cost of 2 times "EE" cydes. The cost of "EE" cycles for SLC7 to acquire the cache line may be uninteresting since IP7 will only "waste time" until the lock is unlocked. The cost of "EE" cycles for SLC30 to reacquire the cache line directly affects not only IP30's performance but also the performance of all processors, including IP7, that are waiting for the lock to be unlocked.

Please refer to FIG. 5 again, in which three Second Level Caches (SLCs 7, 8, and 9) are shown. Basically, these 3 SLCs contain identical logical data structures, which can be implemented in registers that form memory arrays that are organized into the logical elements illustrated here.

Figure 8A:
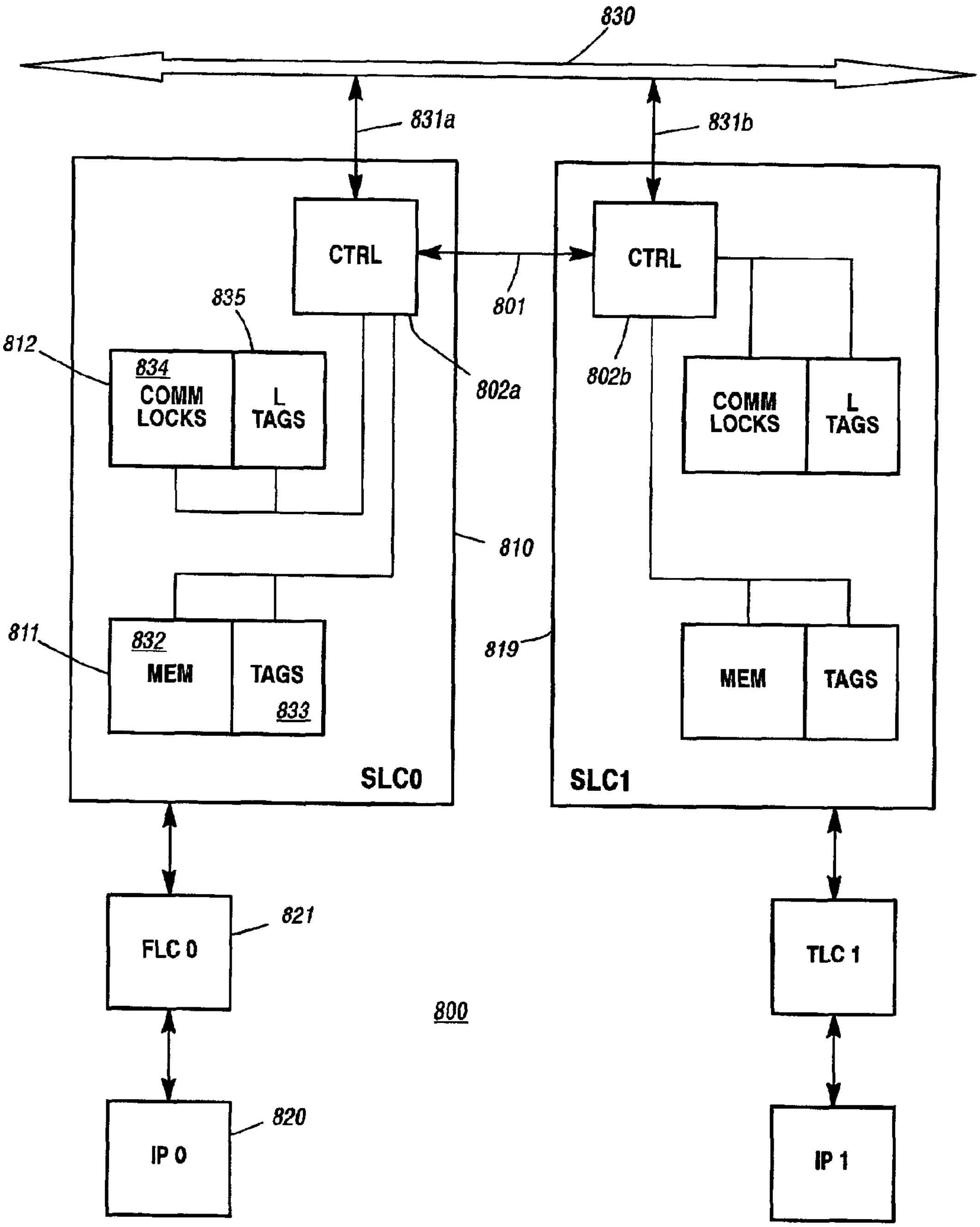
FIGS. 8A and 8B are block diagrams each illustrating two instruction processors and the interconnection between their second level caches. The second level cache structures illustrated in the two
Figure 8B:
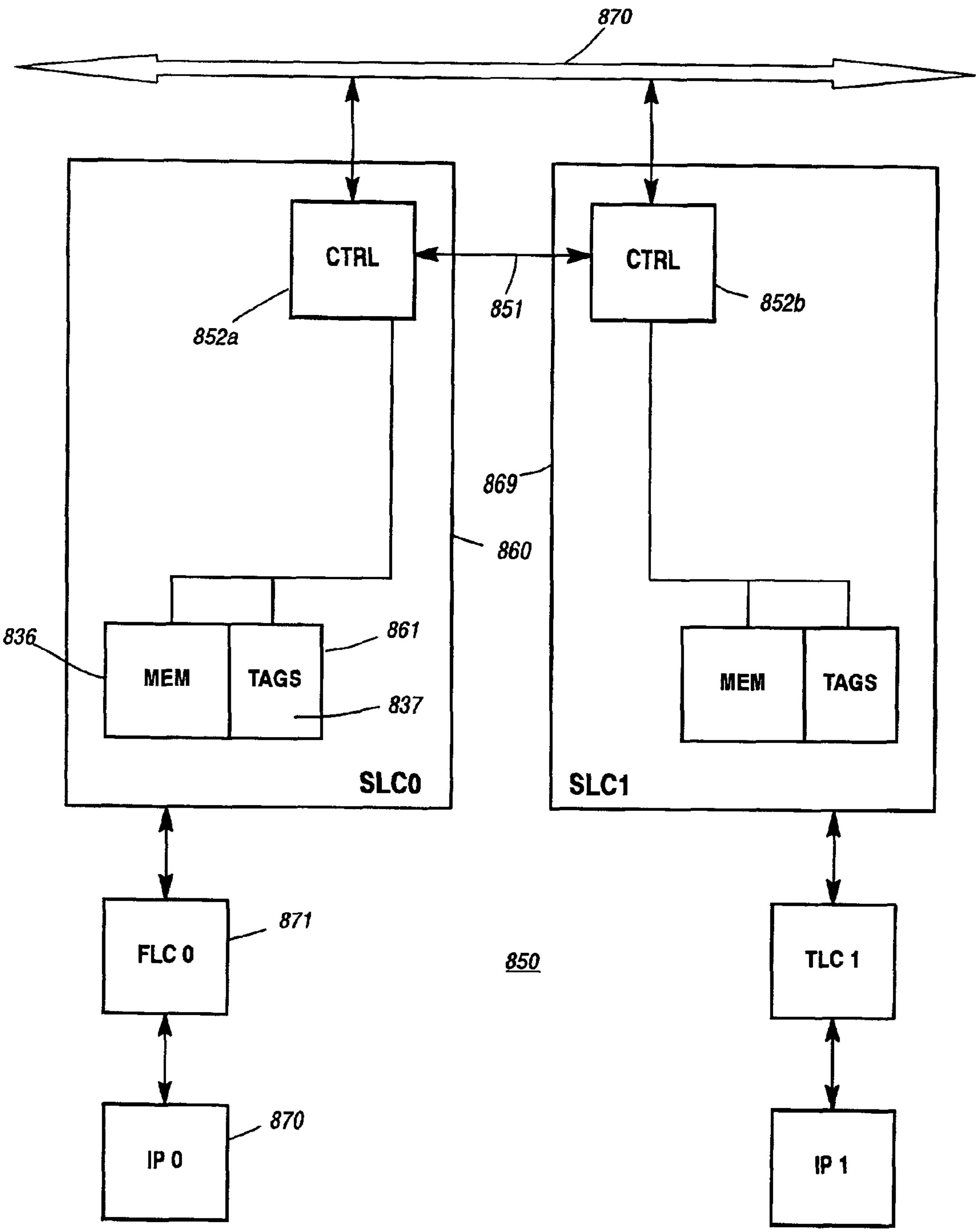

The physical pattern for the side door can be seen in FIGS. 8A and 8B, which describe alternate versions. In these figures, there are two SLC's illustrated and these two are physically dose to each other; here they are SLC0 and SLC1. The FIG. 8A embodiment has the communal lock area 812 physically existing as a separate array from the data and/or instruction cache area 811 (and the units 811 and 812 are not drawn to scale). FIG. 8B on the other hand has the communal locks and tags as an integral part of the data and/or instruction cache 861 with its tags 837, and they are just known to be in a logical division of the memory array 836 by the controller 852*a*.

Consistent with the earlier illustrations, the first level caches (like FLC0 821/871) connect the instruction processor 870/820 to their respective SLCs. (Bus 830/870 would be equivalent to the line 103 in FIG. 1 and lines 851/801 equivalent structures to the R in FIGS. 5 and 4). The side doors operate through controller's 802*a*/802*b* and 852*a*/852*b*, which connect to each other through a radial 801/851. The controllers also handle (although separate controllers could be used) communications with the bus 830/870 that connects the SLCs to the regular memory communications architecture.

For each memory array, there is a separate area for the cache lines (834, 832, and 836) and their tags (835, 833, and 837). This is consistent with the earlier figures and description of the SLC memory organization.

With this in mind we should look at some examples of the function of this invention. Rather than request the cache line of a "communal" lock, a "requesting" second level cache (we'll use SLC7 for this example) operates as follows. (This invention could work for any locks, but it is not believed efficient to use this inventive feature for all locks because there are so many rarely used locks that if it were used for them, the amount of data that would have to go through the side doors would cause loss of cache performance, thus making it possibly slower than the prior systems).

Figure 9:
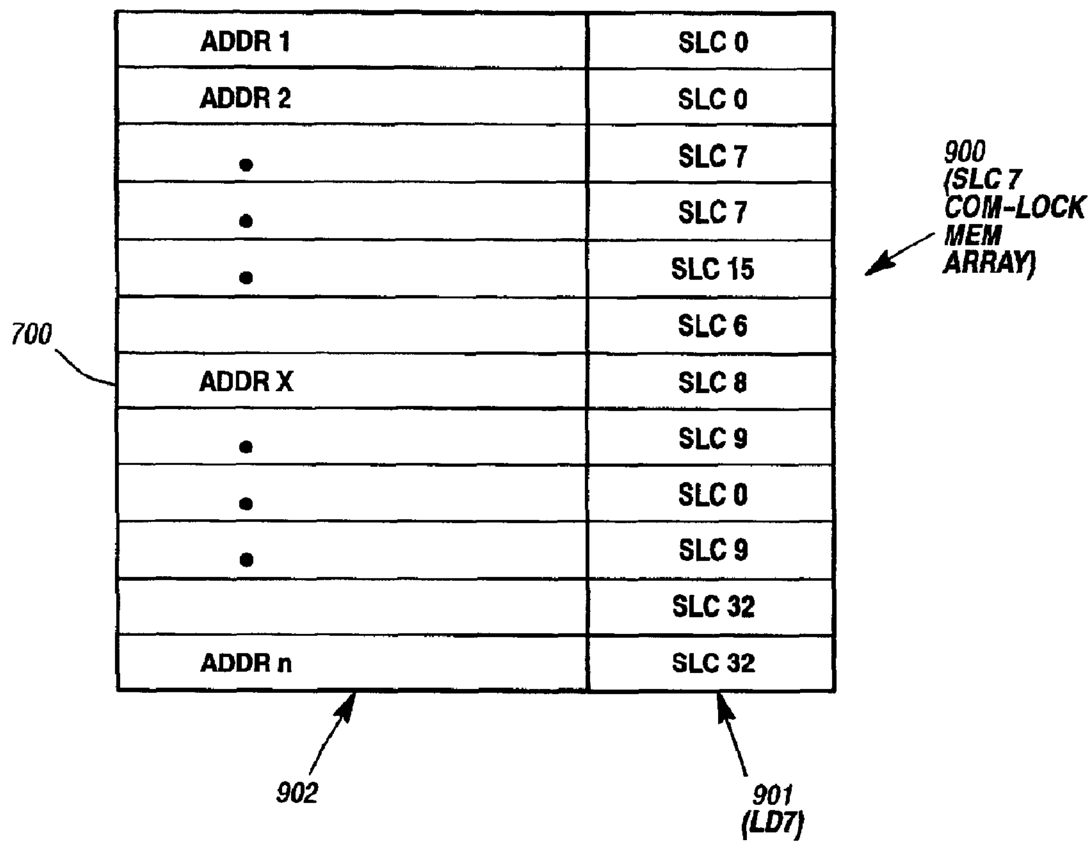
FIG. 9 is a diagram of a block of ordered memory locations containing addresses on the left and directory type information on the right.

Let us refer first to FIG. 9 where the memory array 900 is illustrated, having the directory for SLC7 901 and the associated data area 902. Knowing the address of the requested word (because all the processors in a memory partition use the same virtual address space for the same cache lines available to them), the cache (SLC7) looks in lock directory 7 (LD7 901) to find the mapped second level cache (SLC8 in this example, at line 700) for the lock it wants to request in the preferred embodiment the SLC7 then sends, for example, a test-and-set function to SLC8 mapped to the desired address. Of course, if the search of the communal locks showed the owning cache were itself, no request is sent across second level cache locking interface R and instead the operation is just performed within the cache SLC7. (Because the lock is communal, it is just as likely to be locked by one processor as another. Since no processor has any more expected usage of the lock than any other processor, the communal locks cannot be mapped to "most likely caches".) Once the test-and-set function is sent to be executed in the target SLC (SLC8), SLC8 determines from its lock tag directory whether the cache line of the lock is resident in its lock cache. Usually, the cache line is resident.

If the cache line is not resident, SLC8 then requests exclusive access to the cache line, (through ordinary channels, i.e., not the inventive side door routes) thereby acquiring the only copy of it. Once SLC8 has the communal lock resident in its lock cache, SLC8 checks the value in the addressed word in its communal lock cache (513 of FIG. 5.), optionally changing that value (according to the locking function as passed according to the requesting IP's instruction), and returns a status to SLC7 via the second level cache side door interface.

Again, if SLC7 is the cache mapped to the desired communal lock address, the status is for itself and is not transmitted across the second level cache side door interface.

In FIGS. 8A and 8B, the controller for the mid-level caches was mentioned, and to appreciate the scheme for handling the communal locks, it is beneficial to consider how it functions before describing the process in further detail.

FIG. 13 illustrates the parts required for the preferred embodiment mid-level cache controller, here SLC controller 1300. This SLC controller 1300 is equivalent to either 802*a* or 802*b*, or 852*a* or 852*b* of FIGS. 8*a* and 8*b*, respectively. It handles communal locks based on either the presence of a flag in the instruction from its processor or because the lock message came from a side door. SLC controller 1300 preferably controls the SLC's access to the normal data channel 1310, which communicates with higher-level caches and memory (and in our most preferred embodiments also through a third level cache to other second level caches). Controller 1300 also controls access to the side-door 1330 and the communication of signals with lower level caches, i.e., the processor bus. Because it controls access of the mid-level cache 1300 to data communications, it should also contain some prioritization circuitry to cause communal lock handling to wait until other data transfer tasks free-up cycles for the communal lock processing. One could establish complex algorithms and hardware to qualify the priority function but we believe that this simple schema of operating on communal locks when time and/or communication channels are available is preferred.

INT (Interpretive) circuitry 1400 determines if a communal lock function is requested based on interpreting the lock function instruction (from a processor-associated lower level cache or the processor directly, depending on the architecture in which this invention is used), or a command line from the side door. INT 1400 also can signal the LRG (Lock Request Generator) 1420 to generate a communal lock request to be sent over the side door 1330 to another SLC, using the LMD (Communal Lock Map Directory) 1430 to determine which SLC to send the request to, which the LRG 1420 will control as appropriate for the communications channel adopted by the system designer for SD (Side Door) 1330. If a lock request is sent through the side door to controller 1300, or f the controller receives a lock request from its own processor through communications channel 1320, the LRP (Lock Request Processor) 1410 will process the lock request. The LRP 1410 will thus need the capacity to interpret the possible lock and to handle the changing of the few bits used to indicate lock status. The controller will also have to be able to check a communal lock cache (LC) 1440 to determine if the lock is present in the SLC, and the LRP may be an appropriate part of the circuitry to handle that function. The INT 1400, instead could be used to gather the lock information if the lock was present in the communal lock cache 1440 and forward the lock to the LRP 1410 for handling. The LRP 1410 will also have to send a signal to the LRG to generate a lock request signal to get a communal lock which may be mapped to this SLC but not present. Once the LRP has processed the lock request, a status stripper circuit 1450 can send just the lock status back to the requesting SLC through the side door.

A compare circuit (CMR) 1430 is also important, in that a request to test-and-set requires a look at the lock status to see if it is set before setting it for the new owner/requester if the lock is found to be unset.

Note that in this FIG. 13, the communal lock cache and mapped directory are within the controller, unlike in FIG. 8A. They can be designed to be in either location. The directory information in the LMD 1430 (or at least so much of it as contains the directory to the mapped communal locks for an SLC in which it resides) should be retained for the life of the partition. The ordinary designer will recognize many ways to accomplish this requirement, some of which are described in detail herein elsewhere.

Figure 10A:
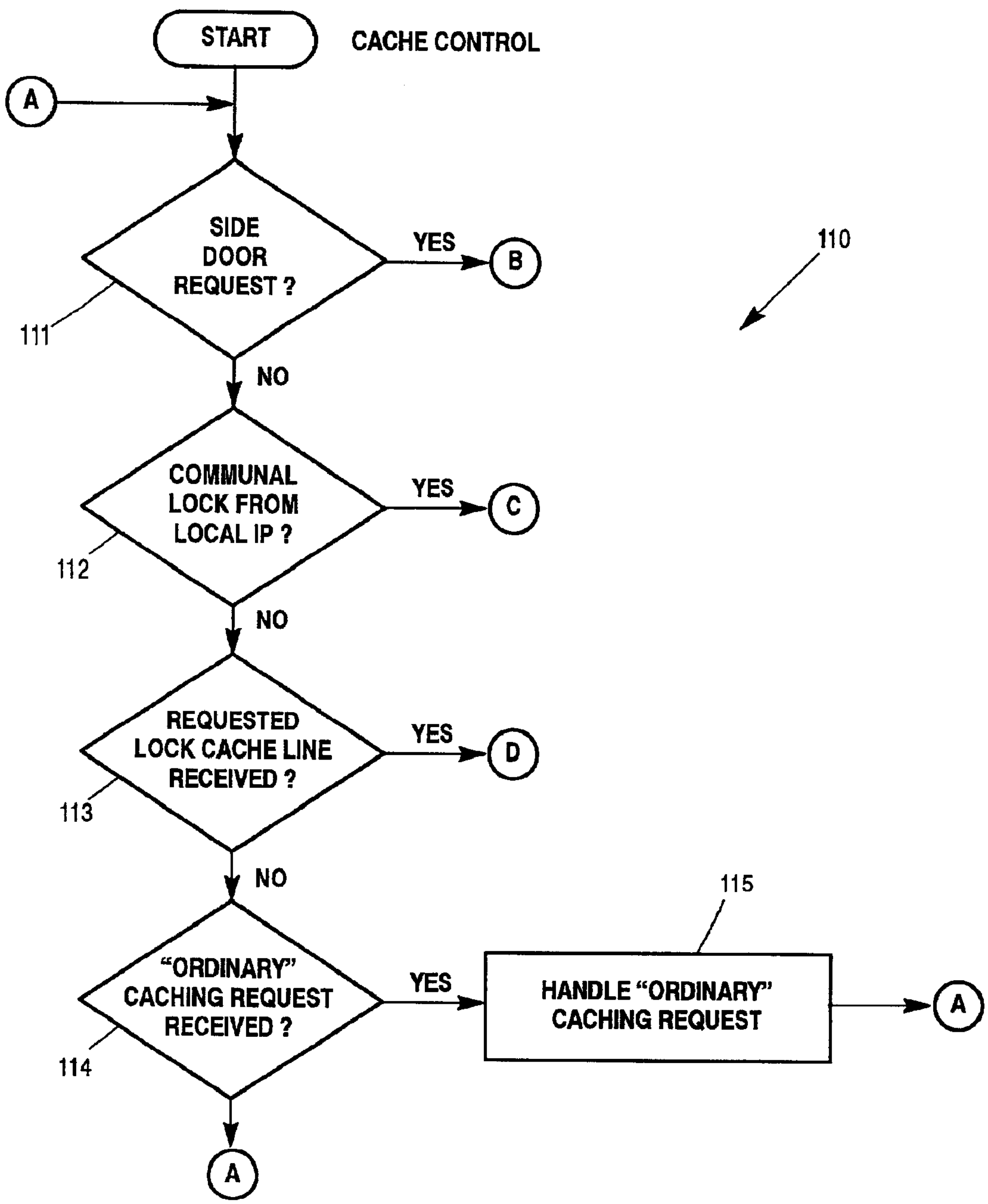
FIG. 10 is a flow chart of a preferred form of the invention.
Figure 10B:
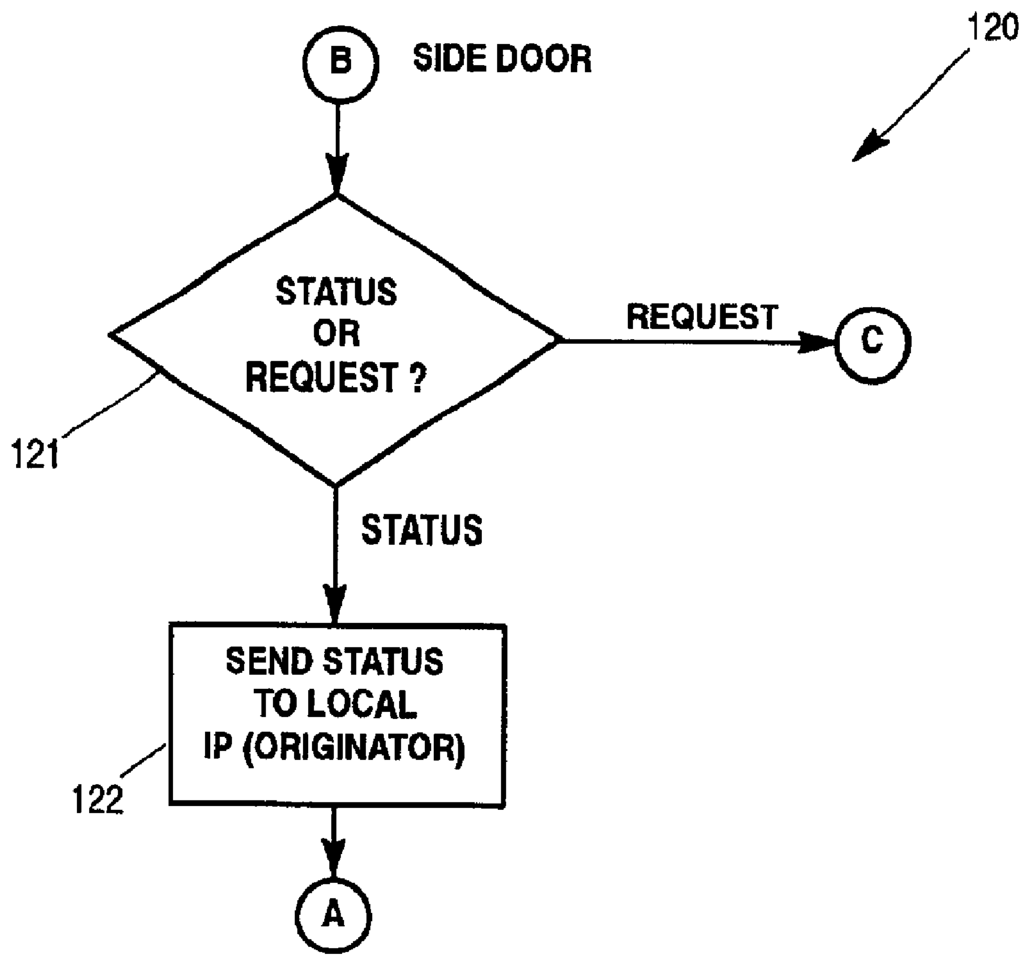

Refer now to FIGS. 10A–D in which a flow chart containing the actions of the mid-level cache (SLC) and its controller is laid out in the first section 110 of FIG. 10A, each of the possible routes for the procedures that can occur in the preferred embodiment are laid out by a decisions tree consisting of four questions 111, 112, 113, and 114, corresponding to the possible actions that can be taken. If the hardware receives a side door request, the area of the process described as "B" handles the processing. If it receives a communal lock from the local-to-this-SLC instruction processor (question 112), then part "C" of the process handles it. (The local-to-this-SLC processor will have set a communal lock flag or by some other indicator let the SLC controller know that the message relates to a communal lock.) If there is a pending request for a lock cache line and this is the lock cache line being received, question 113 sends the process to part "D". If the action is a non-communal, or ordinary caching request (which as mentioned before may contain a lock request, or not) ordinary system operations handle it and the inventive process is no longer involved 115. The part of the process, which responds to these requests, is 110.

As mentioned previously, a lock status may be sent from another SLC in response to a communal lock request by this SLC. Accordingly in part 120, the side door monitoring part of the controller in the requesting SLC will interpret the function as a return of status (from a previously sent communal lock request) in step 121 and return the status to its local processor. If the side door communication to this SLC is not a status response, it is a lock request requiring some change be made to the lock and the request is passed on to part "C" of the process, illustrated in FIG. 10C.

Part "C" 130 can be responsive to two kinds of inquiries and could be laid out differently as will be readily understood by one of skill in this art. Separate "parts" could be structured for responses to inquiries from the local instruction processors or from the side door, for example, and other organizations of these steps can be thought of without altering the inventive concepts taught herein. In the illustrated part "C" 130 if the lock is not mapped to this cache (SLC) as asked at step 131, the SLC should send a communal lock request through the side door to the mapped SLC for this communal lock.

If the request is coming from a side door from another SLC or the answer to the question of step 131 is yes, the question becomes is the lock sought after in this lock cache, 133. If it is found not present in the communal lock cache, then the cache line should be requested through the ordinary system requests for cache lines. If it is present, the lock value can be checked and compared to the desired value in step 135. If the desired value (say, unlocked) is not what is in the lock, the process can wait (optionally, at step 136) or just prepare an unsuccessful status report (step 137) to send back to the requesting processor or SLC.

If the lock is unlocked, the controller can lock it in step 138 and pass the new value or just an indication of success to the requesting processor or SLC (step 139). (if desired, the lock itself could be passed, but it is more efficient to simply process the lock in the cache to which it is mapped, so we prefer to do it that way. As a less preferred alternative embodiment, one could instead pass the locks through the radial however).

If steps 137 or 139 are from local instruction processors, the status/result is sent to the local instruction processor (step 142) or if the request came through the side door the status/result is sent to the requesting cache (step 141).

Figure 10C:
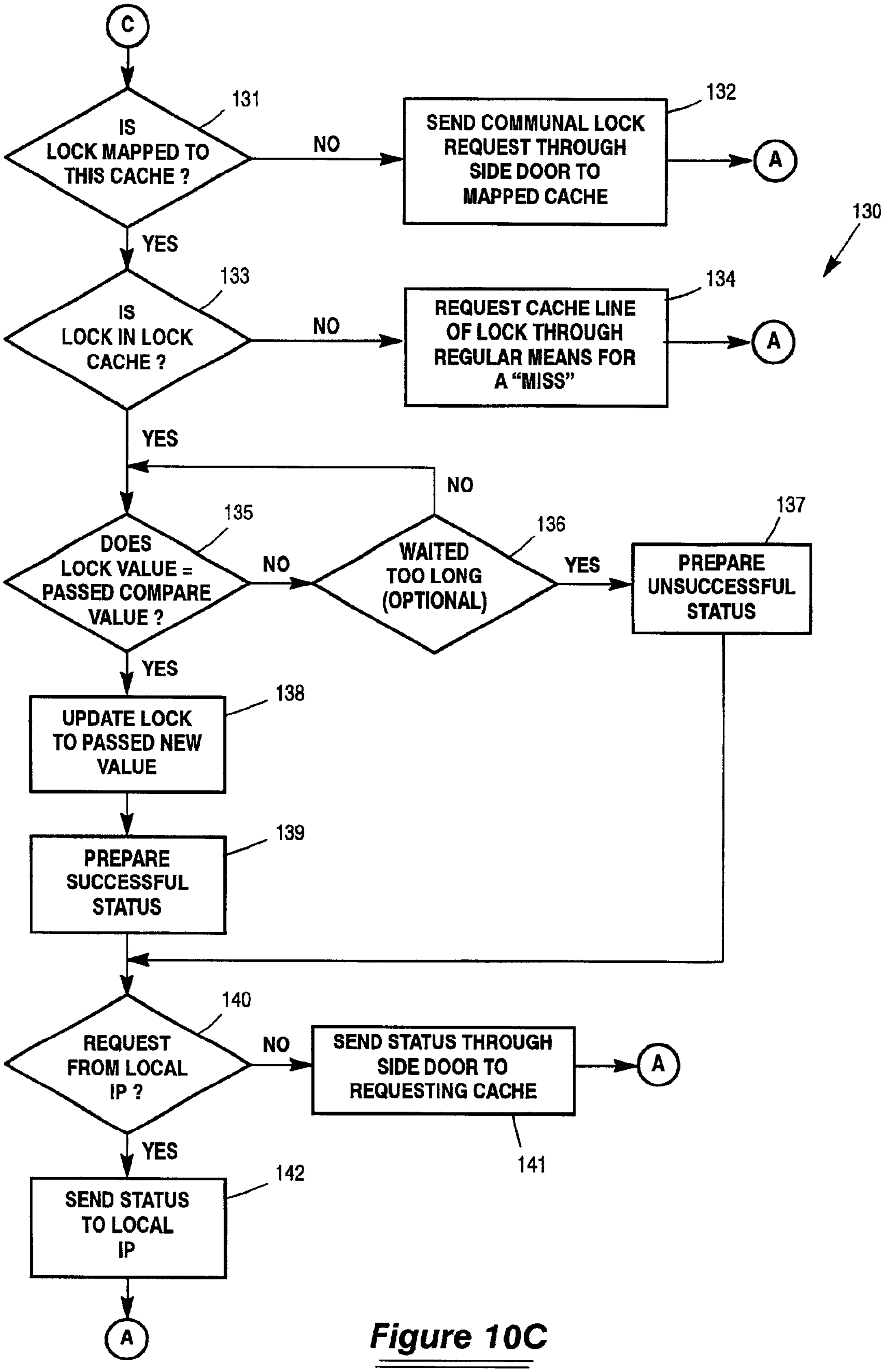
Figure 10D:
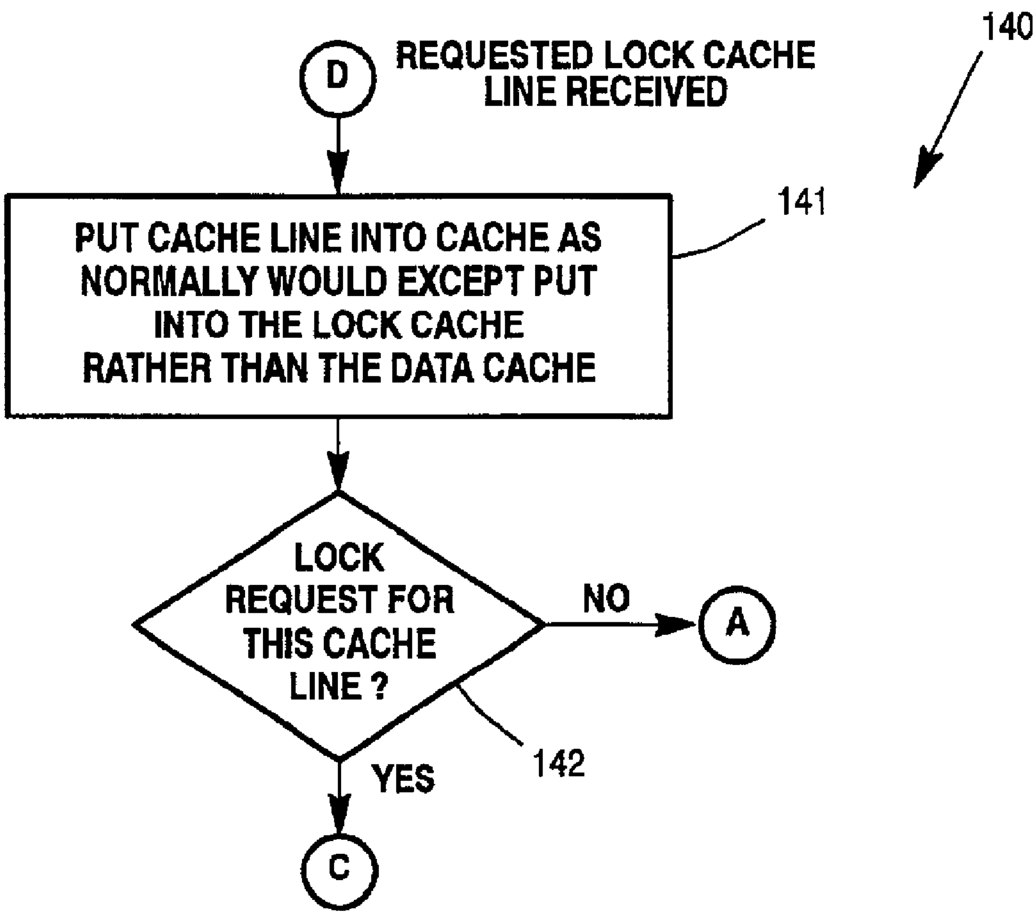

In FIG. 10D, the requested lock cache line is received at query 112 from FIG. 10A. Because this is a communal software lock (CSWL), it will be placed into the lock cache in the cache rather than the data cache, which as the reader will recall from the detailed description above is a separate memory area within the second level caches (SLCs) as detailed in FIGS. 5 and 8A. If there is a pending request for this cache line 142, the handling is accomplished through the steps of FIG. 10C. Otherwise the process defaults to FIG. 10A.

It should be recognized that a priority system is also required for running the mid-level caches, which are responsible for and responsive to the communal software lock requests. In other words, if an ordinary memory transfer is requesting data from the SLC at the same time a communal lock request is occurring or being processed, there needs to be a sequencer to order the conflict and allow one or the other to proceed. In the preferred embodiments we prefer to allow the ordinary transfers to occur first and then use available cycles for the communal lock requests, but other designers could provide for more elaborate timeout hardware and software if desired to assure communal lock function operates eventually. In our estimation, sufficient cycles will be available for CSWL processing as a second priority without any interventional efforts, and we prefer to keep the process and the supporting hardware as simple as possible. Nevertheless, some interleaving can be adopted to provide second priority interleaving for the communal locks to ensure they will be handled in a timely manner.

In another example in the scheme of this invention, when IP7 (refer back to FIG. 4) is attempting to lock a lock that has already been locked by IP9, and where SLC8 is assigned the cache line containing the lock, SLC7 first finds the lock it seeks as mapped to SLC8. SLC 7 then sends the lock function to SLC8, which has the cache line containing the lock. The SLC8 informs IP7 through SLC7's side door communications channel that the lock was already locked (by IP9/SLC9). When IP9 wants to unlock the lock, SLC9 sends the unlock function to SLC8. In this example, the sequence sends a request to lock, the reply is a status for the lock request, a request for unlock is sent, and then a status for the unlock is sent. (Note that both the lock instruction and the unlock instruction are hardware-indivisible, locking operations.) This scheme has less traffic on the memory buses than passing ownership of the whole cache line between the second level caches as in the existing scheme, which is used for most locks. The traffic sent in this scheme is all side-door, but there is far less traffic if both side-door and regular, hierarchical cache/memory/bus structure is counted, and the time required in processing or memory cycles is significantly reduced for processing high contention locks that operate through this Communal Lock scheme, thus increasing overall system throughput.

From the point of view of the memories involved, the MSU knows which (third level) cache owns the cache line of the communal lock, because it looks like a regular cache line to the Memory Storage Unit in the MSU directory. The third level cache knows (if it remembers, which it probably does not) which of the second level caches it covers owns the communal lock. The second level cache knows it owns the communal lock. Only the owning second level cache knows the value of the lock. Just like any ordinary data that is being written, only the owning second level cache knows the data that is in the cache line. If the owning cache decided to flush the cache line (towards memory), then some higher level in the hierarchy would end up owning the cache line and it would know the value of the data in the cache line. It is unlikely the owning second level cache would ever flush the communal lock once it acquired it.

The mapped second level cache usually has the cache line containing the lock in the lock cache. After initially being loaded from the MSU on the first reference to it, the cache line stays in the mapped second level locking cache. Access to other data or instructions in the second level cache do not conflict with the associativity of the lock cache; therefore, the lock is unlikely to be aged out of the locking cache due to data or instruction cache conflicts. If another processor attempts to access the cache line other than with a lock instruction, it receives the current value and invalidates the copy in the mapped second level lock cache. Since locks, particularly communal locks, should be kept in cache lines by themselves and are accessed only with lock-type instructions, the lock cache line remains in the lock cache of its mapped second level cache. A small number of locks are frequently accessed by multiple processors. This small number of locks can be maintained in the lock caches.

The reason this invention works well within ordinary design constraints is that the non-communal locks are still forced to function like ordinary data in the preferred embodiments. A relatively small number of communal locks exist. With few locks, relatively little traffic associated with those locks, a fast and inexpensive Lock Interface (like our side door and radial system) can be built. If the second level cache side-door connection were very powerful, all inter-cache data could be transmitted on that powerful side-door. Implementers can always build a low volume, special purpose interface that is much faster and less complex than the same interface to carry all the inter-cache traffic by only handling the communal lock traffic, which by itself will add overall system performance.

Measurements have shown a very skewed distribution of lock conflicts. A user therefore can run tests to find the high contention locks via perform measurements of the system and work them into the set-up routines for the system once they are known. There are certain locks in the system and in applications that are heavily used. The popular locks are the ones that should be in banks marked communal. The not so popular locks have a good chance of being in memory anyway by normal cache replacement algorithms, so it is less likely that the lightly used locks could be accelerated.

Figure 6:
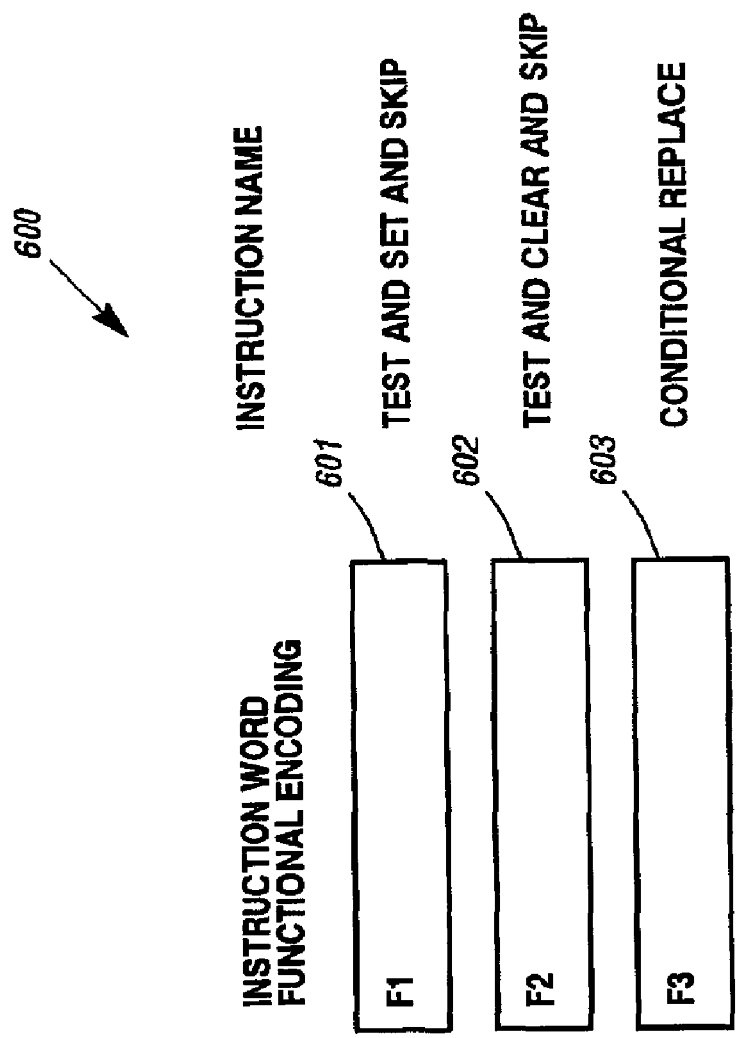
FIG. 6 is a high-level chart and diagram of lock instructions.

In the preferred embodiment, FIG. 6 shows the locking-type instructions: Test and Set and Skip (previously described), Test and Clear and Skip (previously described), and Conditional Replace instruction. All locking instructions have indivisible access such that no other access can be made between the reading and (conditional) writing of the memory operand.

Conditional replace instructions provide two register operands and an address. If the addressed location has the value of the first register operand, store the second register operand to the addressed location.

Figure 7:
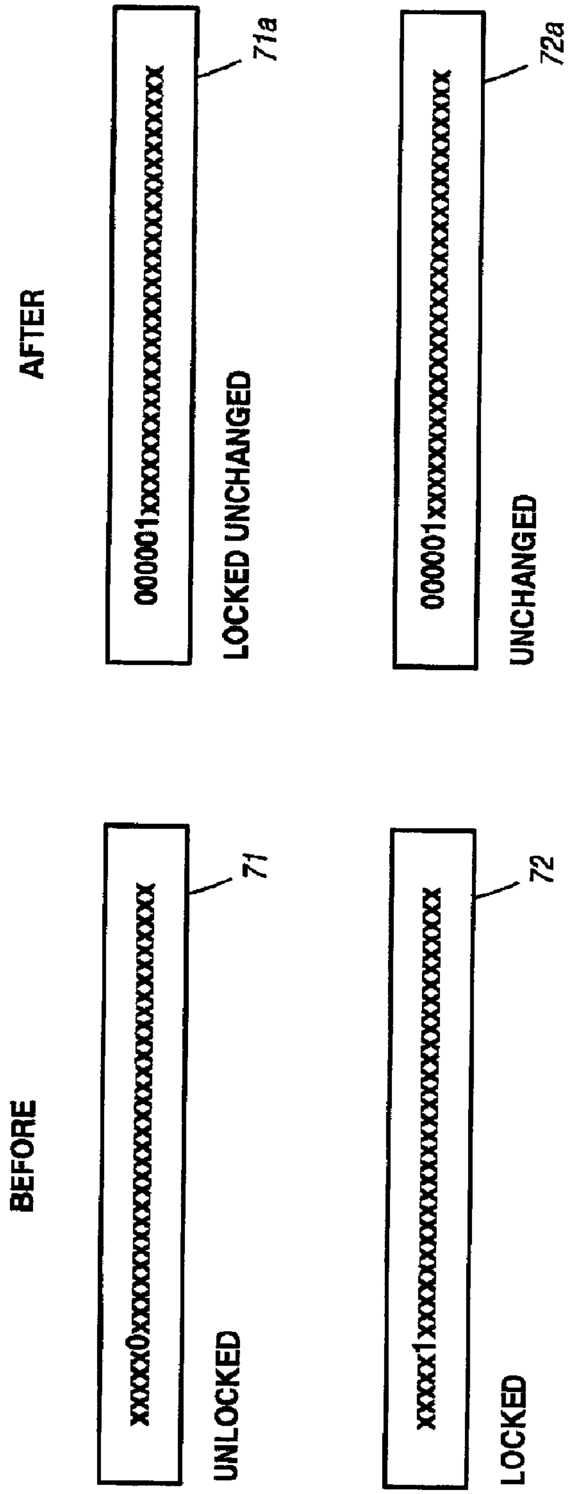
FIG. 7 is a diagrammatic chart illustrating the data manipulation of the test and set and skips instruction, both for an unlocked lock and an already locked lock.

FIG. 7 shows the data manipulation of Test and Set and Skip instruction. If the rule, as stated before, is that the communal lock is in a cache line by Itself, then the SLC owning the communal lock need not hold more than the lock—there is no other data. If a processor references the cache line via a non-locking instruction, then the cache line is sent to that processor as normal data. The owning SLC could know enough to send a bunch of nulls to make up the rest of the cache line. On the other hand, we have not required the lock to exist at a fixed location within the cache line. It may be as easy for the SLC owning the communal lock to just cache the whole cache line, but the actual choice of word form for implementation is not important. Thus, if the communal lock cache line 71 is unlocked before the operation of a Test and Set and Skip instruction, after the instruction is executed, the result is that the lock is locked 71*a*. If instead the lock is locked 72 when it is tested, then after the execution of the TSS instruction the lock will remain locked (in favor of the previous owner).

In the preferred embodiment, one way to implement sending the lock function to the mapped second level cache is to send two operands: if the location contains the first expected value, replace the location with the second value as in question of 135 and operation 138 of FIG. 10C. Another way to implement is to send a defined function with optional data by replacing question 135 with an operation to perform the passed operation on the lock using the specified data in the mapped-to second level cache. Thus, in this send the function to the data operation, the lock data remains in the mapped-to mid-level cache, and the function (requesting a lock) is sent by the requesting cache or processor to that mapped-to cache. The mapped-to cache retains the (possibly now modified Communal Software Lock (CSWL) data) and returns status back to the requesting processor or mid-level cache. This alternate implementation would work best for maintaining a counter (modulo some binary number) in which the requesting processor requests the "Increment operation" and would not know the value before incrementing but would receive the (modulo) result after the passed operation.

Figure 11:
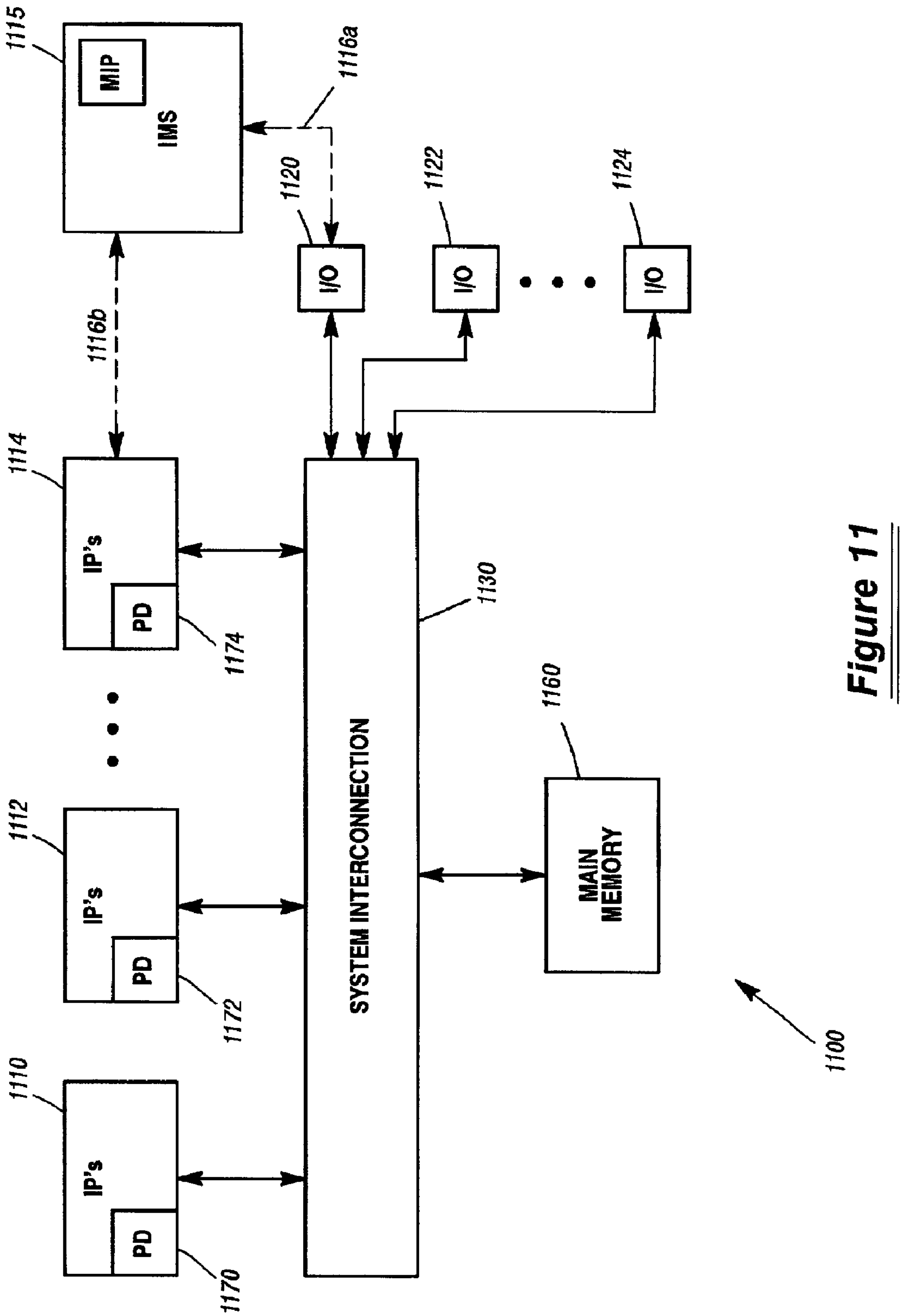
FIG. 11 is a block diagram of a computer system that employs a preferred embodiment of the invention, in accord with the invention.

Refer now to FIG. 11 in which a block diagram of the main components of a preferred embodiment computer system 1100 is illustrated. In this system, the Memory system components exist within larger systems; the main memory MSU's (Memory Storage Units) are within the Main Memory 1160, the processor blocks 1110, 1112, 1114 contain several instruction processors and each one has a first level cache (FLC), an intermediate level cache (SLC), and a higher level intermediate level cache (TLC), which is shared among four (4) instruction processors, called a sub-pod in Unisys terminology (a partition can be multiple sub-pods). An abbreviation view of this arrangement is seen in FIG. 1, wherein, for example, the IP (Instruction Processor) IP31 has FLC31 and SLC31 in its memory storage hierarchy. Four (4) other processors (two not shown) have the high intermediate cache, TLC7 in their memory storage hierarchy between the instruction processor and the main memory (here illustrated by MEM105). The X-BAR (crossbar) is the same as the System Interconnection 1130 of FIG. 11. The difference between FIGS. 1 and 11 in the organization of components is that FIG. 11 is organized by partition, thus having a partition definition structure 1170, 1172, 1174 within registers (invisible to IP software) in the units 1110, 1112, 1114, respectively. These partition definition structures supply translation structures to segment the main memory among them. The partitions are all integrated through a set-up and maintenance data channel 1116*b* to an Integrated Management System (IMS) on a separate computer system 1115 having a management instruction processor (MIP) and software (IMS) for handling the set-up and housekeeping tasks for the larger, multiprocessor computer system. Thus the computer system 1100 may be running one or several partitions within itself. The IMS (Integrated Management Software) in preferred embodiment systems sets up the partitions by directing which processors control which functions within each partition, which areas to go to read memory translation tables for the partition to be organized in tandem with the available parts of the memory, and other functions. Most importantly for this invention, the IMS communicates which addresses have the communal locks for each partition in them. There are various ways such a communication can be accomplished which will depend on the architecture of the IMS to partition component communications and any way that this data is communicated will be acceptable to the incentive needs here so long as the information regarding where the communal locks are, and the hash that assigns particular communal locks to each intermediate level (SLC) caches should also preferably be coordinated through the system maintenance and set up system (the IMS).

Basically, the process is just a few steps. In setting up the partitions (even if only one partition) there is a need to establish for the SLC communal lock cache and communal lock directory in each SLC and indicating what the mapping is for all communal locks and their addresses which may be accessed by the partition. Preferably in a multiprocessor architecture the management system (such as the IMS) does this at set-up for each partition. If a partition needs to be changed because, for example, there are suddenly bad memory ranges, the IMS will contact the processor responsible for the system, pass the information on the changed memory organization, and let the partition continue to operate. Once the partition is set up, the system, as described herein, should operate as described herein to handle the communal locks through the side door system.

Figure 12:
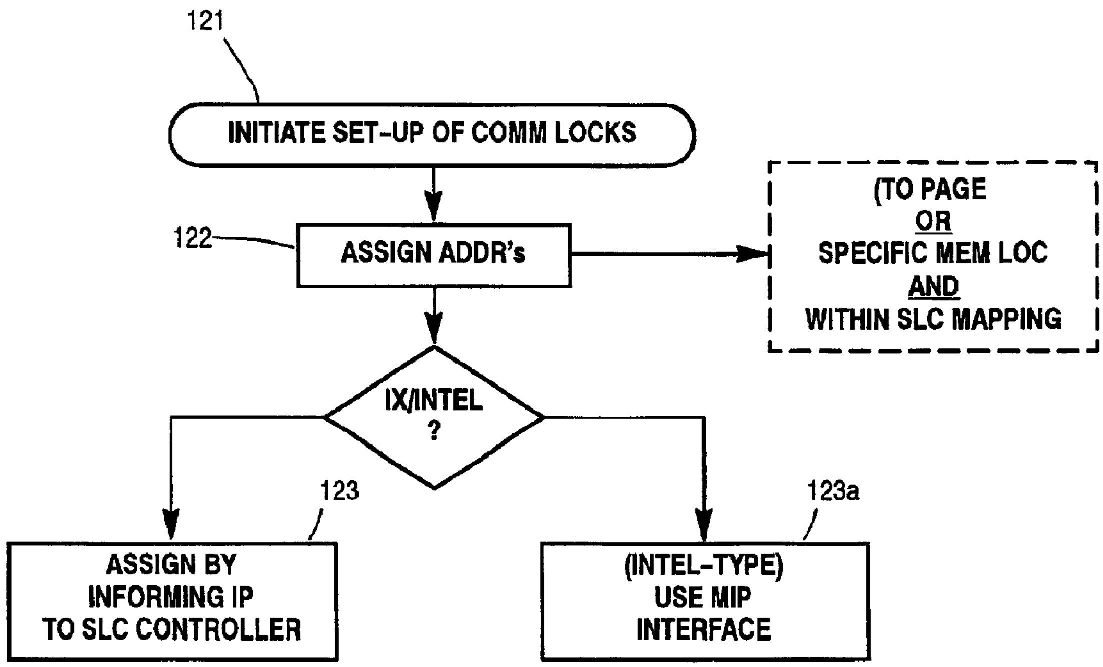
FIG. 12 is a flow diagram illustrating a set up procedure in accord with a preferred embodiment of the invention.

An overview of this set-up function process 120 can be seen in FIG. 12. The initiation step 121 can begin at the start of a partition or during it's running to accommodate user needs or maintenance requirements. In either event, the addresses have to be assigned 122. In this step the physical mapping of the memory and the communal locks in the preferred embodiment is allocated to the partition, and in the case of the communal locks, the particular addresses are mapped to the particular SLC's assigned to each such lock. As described above this can be to a page or a bank descriptor or other well known memory structure. In one preferred embodiment, using IX technology by Unisys Corporation, or Intel, the IMS system simply tells 123 the controlling processor for a partition where in shared memory area this information is loaded and that processor then loads it into the appropriate SCL mapping areas. If Intel processors and mid-level caches were slightly redesigned or adapted to know communal locks, then Microsoft (and Unix and Linux) would also have to be aware of communal locks (and therefore put them in appropriate Banks or Pages or Segments) to take advantage of them.

Accordingly, the scope of the invention is only limited by the following appended claims.

What is claimed is:

1. A method of handling software locks in a multiple instruction processor computing system having a hierarchical cache architecture between main memory and said instruction processors wherein software locks inquiries are handled on two tracks, a first conventional software lock handling process and a second process for handling communal software locks, wherein said second process handles inquiries from inquirers and comprises:

i. determining, by a communal lock processor associated with a particular mid-level cache within said hierarchical cache architecture, whether a lock inquiry from an inquirer is for a Communal SoftWare Lock (CSWL) or for a conventional software lock, ii. processing said CSWL lock inquiry if said determination determines that the inquiry is for a CSWL, else allowing a conventional software lock process to process said conventional software lock request.

2. A method of handling software locks as set forth in claim 1 wherein step (I) further comprises:

(a) determining, by a mid-level cache, if said lock request is from another mid-level cache through a side door, and if so, processing said lock request as a CSWL lock request, or (b) determining if said lock request is from an instruction processor associated with said mid-level cache, and if so, determining if said lock request is for a CSWL by reference to a mapping of all available CSWLs, and if so, performing step (ii).

3. The method of claim 2 wherein step (b) further comprises:

determining whether an inquiry is a request for a lock or a status report, and if a status report, sending information on the status of the lock to the inquirer which in such case is a local instruction processor.

4. The method of claim 1 wherein said step (ii) comprises determining if the CSWL is mapped to the mid-level cache receiving said inquiry, and if not, sending a request for said CSWL to a mapped mid-level cache owning said CSWL, but if the CSWL is mapped to the midlevel cache receiving said inquiry, determining if the CSWL is present in said midlevel cache, and if not, requesting a cache line for said CSWL.

5. The method of claim 4 wherein said requesting of a cache line for said CSWL is made through a communication channel used for ordinary, non-CSWL data.

6. The method of claim 5 wherein if said CSWL is located in said mid-level cache, making a determination whether a requested CSWL is available or locked to a previous inquirer, and if available, locking said CSWL and preparing a value to pass indicating said lock was locked to said inquirer making said request, but if said CSWL is not available, preparing a value to pass indicating said lock was not available to said inquirer making said request.

7. The method of claim 4 wherein if said CSWL is present in said mid-level cache, making a determination whether a requested lock value passed in the CSWL inquiry is a same value as an extant value which is in said CSWL located in said midlevel cache.

8. The method of claim 7 wherein if said requested look value and said extant lock value are the same, updating the extant value to a passed new value and preparing a status successful value, but if the extant value and the requested lock value are not the same, preparing an unsuccessful status value, and in both events, sending said prepared status value to said inquirer.

9. The method of claim 1 further comprising:

establishing a mapping of all CSWLs for a partition before startup of said partition, setting up a set of memory registers containing addresses of said all CSWLs for said partition.

10. The method of claim 9 wherein each CSWL is mapped to a particular mid-level cache.

11. The method of claim 1 further comprising:

establishing a mapping of all CSWLs for a computer system before start-up of said computer system, setting up a set of memory registers containing addresses of said all CSWLs for said computer system.

12. A method of handling software locks in a multiple instruction processor computing system wherein B e locks inquiries are handled on two tracks, a first conventional software lock handling process and a second process for handling communal software locks, comprising:

prior to running an operating system in said multiple instruction processor computing system, determining which software locks wall be high contention locks, assigning each high contention lock to a particular one of a set of mid-level caches in said multiple instruction processor system wherein said high contention locks are communal locks, setting up a system for holding said assignments so as to enable a determining by each of said particular ones of said set of mid-level caches which of said particular ones is assigned to each said high contention lock, running said operating system and allowing application programs to run, using either or both of said first conventional software lock handling process and said second process for handling said communal software locks as needed by said operating system and or application programs.

13. A method for handling communal software locks in a multiprocessor computer system having a set of mid-level caches with a radial connection among said mid-level caches for transferring signals related to said communal software locks and wherein said communal software locks (CSWLs) may be set or not set, wherein said processing comprises setting or reporting on a set condition by sending signals to a requesting processor, and wherein said setting or reporting is done in and by a one of sold mid-level caches.

14. The method of claim 13 wherein a mapping assigns each CSWL to a particular one of said mid-level caches, and wherein each CSWL request checks said mapping so as to direct said each CSWL request to an appropriate one of said particular ones of said mid-level caches, that appropriate one being an assigned mid-level cache for a CSWL which is a subject of said CSWL request.

15. The method of claim 14 wherein if a mid-level cache does not have present a requested CSWL at a time when it receives a CSWL request for a CSWL to which it is assigned by said mapping, said midlevel cache requests a cache line for said requested CSWL to which it is assigned by said mapping, so as to obtain the said CSWL and then perform sold processing on said requested CSWL for a requesting processor making a request for said CSWL.

* * * * *